(12) United States Patent
Berthier et al.

(10) Patent No.: US 9,334,464 B2
(45) Date of Patent: May 10, 2016

(54) MICROCAPSULES AND USES THEREOF

(71) Applicant: FIRMENICH SA, Geneva 8 (CH)

(72) Inventors: Damien Berthier, Geneva 8 (CH); Andreas Herrmann, Geneva 8 (CH); Nicolas Paret, Geneva 8 (CH); Lahoussine Ouali, Geneva 8 (CH)

(73) Assignee: Firmenich SA, Geneva (CH)

( * ) Notice: Subject to any disclaimer, the term of this patent is extended or adjusted under 35 U.S.C. 154(b) by 0 days.

(21) Appl. No.: 14/361,389

(22) PCT Filed: Nov. 26, 2012

(86) PCT No.: PCT/EP2012/073578
§ 371 (c)(1),
(2) Date: May 29, 2014

(87) PCT Pub. No.: WO2013/079435
PCT Pub. Date: Jun. 6, 2013

(65) Prior Publication Data
US 2014/0323376 A1    Oct. 30, 2014

(30) Foreign Application Priority Data
Nov. 29, 2011  (EP) .................................... 11191101

(51) Int. Cl.
| | | |
|---|---|---|
| *A61K 8/00* | (2006.01) | |
| *C11B 9/00* | (2006.01) | |
| *B01J 13/06* | (2006.01) | |
| *B01J 13/16* | (2006.01) | |
| *C11D 3/50* | (2006.01) | |

(52) U.S. Cl.
CPC ............... *C11B 9/0019* (2013.01); *B01J 13/06* (2013.01); *B01J 13/16* (2013.01); *C11D 3/505* (2013.01)

(58) Field of Classification Search
CPC ....................................................... C11D 3/505
USPC ............................................................. 512/4
See application file for complete search history.

(56) References Cited

U.S. PATENT DOCUMENTS

| | | | |
|---|---|---|---|
| 4,396,670 A | 8/1983 | Sinclair | |
| 2007/0202063 A1 | 8/2007 | Dihora et al. | |
| 2008/0176780 A1* | 7/2008 | Warr et al. | 510/103 |

(Continued)

FOREIGN PATENT DOCUMENTS

| | | |
|---|---|---|
| EP | 1 741 775 B1 | 4/2009 |
| EP | 1741775 B1 | 4/2009 |

(Continued)

OTHER PUBLICATIONS

International Search Report and Written Opinion, application No. PCT/EP2012/073578, Jan. 11, 2013.

(Continued)

*Primary Examiner* — John Hardee
(74) *Attorney, Agent, or Firm* — Winston & Strawn LLP

(57) ABSTRACT

The present invention relates to core-shell microcapsules comprising photolabile 2-oxoacetate pro-fragrance molecules capable of liberating an active molecule such as, for example, an aldehyde or ketone upon exposure to light. The present invention concerns also the use of said microcapsules in perfumery as well as the perfuming compositions or perfumed articles comprising the invention's microcapsules to provide a prolonged release of fragrant aldehydes and/or ketones.

12 Claims, 2 Drawing Sheets

(56) References Cited

U.S. PATENT DOCUMENTS

2010/0216679 A1* 8/2010 Batchelor et al. ............. 510/107
2010/0287710 A1 11/2010 Denutte et al.

FOREIGN PATENT DOCUMENTS

| | | | |
|---|---|---|---|
| GB | 2432843 | A | 6/2007 |
| GB | 2432850 | A | 6/2007 |
| GB | 2432851 | A | 6/2007 |
| GB | 2432852 | A | 6/2007 |
| WO | WO9960990 | | 12/1999 |
| WO | WO0141915 | A1 | 6/2001 |
| WO | WO2005054422 | A1 | 6/2005 |
| WO | WO2007062733 | A1 | 6/2007 |
| WO | WO2007062833 | A1 | 6/2007 |
| WO | WO2008016684 | A1 | 2/2008 |
| WO | WO2009153695 | A1 | 12/2009 |
| WO | WO2010044834 | A2 | 4/2010 |
| WO | WO2011161618 | A1 | 12/2011 |

OTHER PUBLICATIONS

Bône et al., "Microencapsulated Fragrances in Melamine Formaldehyde Resins," CHIMIA, 65(3):177-181 (2011).

Herrmann, "Controlled Release of Volatiles under Mild Reaction Conditions: From Nature to Everyday Products," Angew. Chem. Inc. Ed., 46:5836-5863 (2007).

Herrmann, "Using photolabile protecting groups for the controlled release of bioactive volatiles," Photochem. Photobiol. Sci., 11:446-459 (2012).

International Search Report and Written Opinion, application PCT/EP2012/075393, mailed Jan. 11, 2013.

Bonatz et al., Acta Polymerica 40 (1989) pp. 683-690.

Dietrich et al., Acta Polymerica 40 (1989) pp. 243-251.

Dietrich et al., Acta Polymerica 40 (1989) pp. 325-331.

Dietrich et al., Acta Polymerica 41 (1990) pp. 91-95.

Lee et al., J. Microencapsulation 19 (2002), p. 559-569.

* cited by examiner

Figure 1: Shell thickness of microcapsules A4, B4 and C4 as a function of diameter and polyurea concentration measured by AFM.
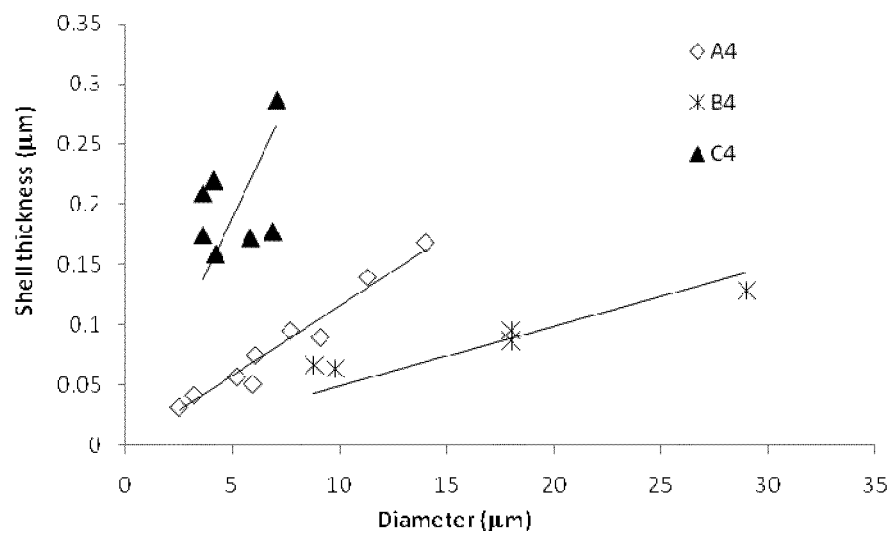

Figure 2: Dynamic headspace analysis for the evaporation of pure fragrance aldehydes (---x---), or of fragrance aldehydes released from microcapsules A4 or E10 according to the invention (—●—), or of fragrance aldehydes released from the corresponding prior art pro-fragrance (—□—) in an all purpose surface cleaner application.
(a)
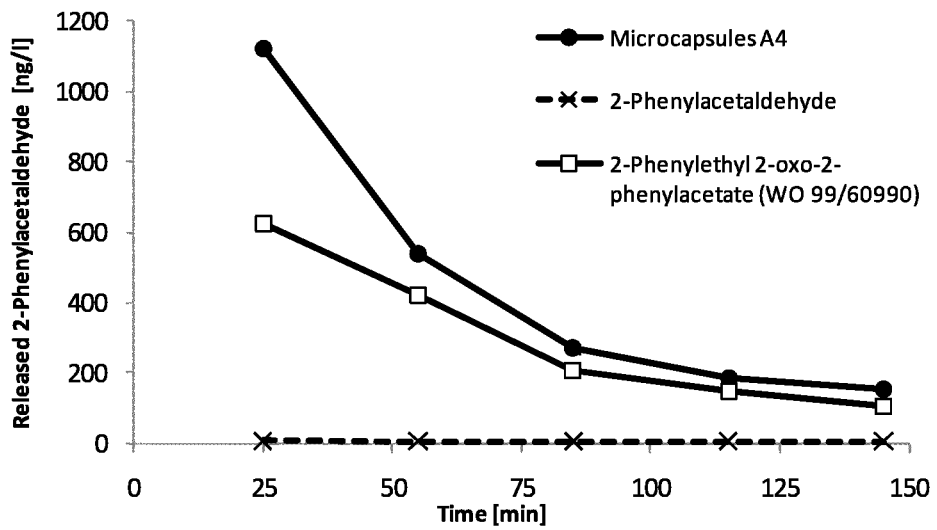
(b)
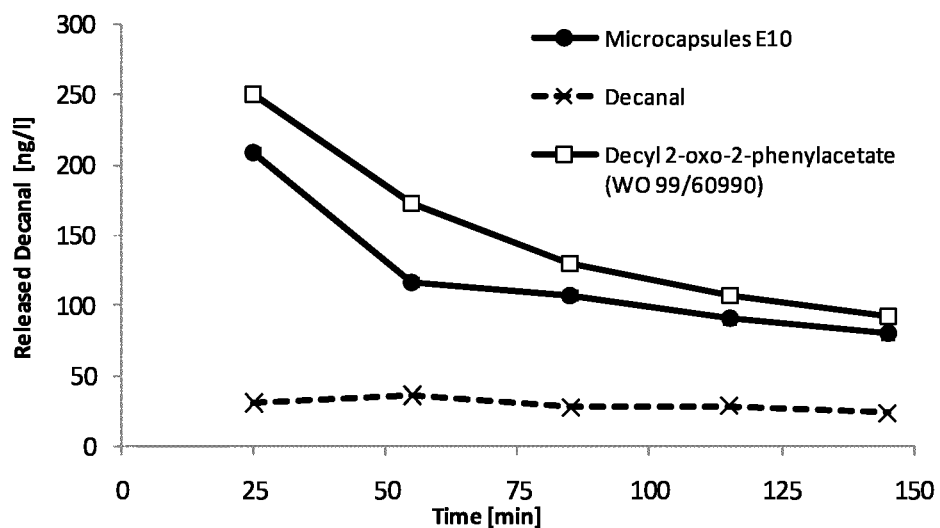

MICROCAPSULES AND USES THEREOF

TECHNICAL FIELD

The present invention relates to water-dispersable core-shell type microcapsules capable of increasing the long-lastingness of the perception of the odor of fragrance aldehydes and ketones upon exposure to light. The invention concerns the encapsulation of photolabile 2-oxoacetate pro-fragrances, so as to increase control of the release of fragrance aldehydes and ketones in applications of functional perfumery, and the use of the resulting microcapsules in consumer products.

PRIOR ART

One of the problems faced by the perfume industry lies in the relatively rapid loss of the olfactive benefit provided by odoriferous compounds due to their volatility, particularly that of "top-notes". Also, some fragrance ingredients can be unstable in applications of functional perfumery and get lost due to degradation or to rapid evaporation. These problems are often tackled through the use of delivery systems, e.g. capsules containing a perfume, to release the fragrance in a controlled manner.

Encapsulation of the fragrance can at least partially solve the evaporation problem, but many types of microcapsules are known to lose part of the fragrance during storage, via diffusion through their shells or walls or as a result of the nature of the consumer product into which they are incorporated and which contains surface active ingredients capable of causing leakage of the perfume.

On the other hand, it has also been proposed in the prior art to use suitably designed fragrance precursors, or, as more currently designated, "pro-fragrances", as a means to delay the release of volatile fragrance ingredients and thus prolong their perfuming effect by reducing their otherwise rapid evaporation. However, the stability of such precursors in application formulations can also be limited in time. A pertinent example in the prior art is the patent application WO 99/60990 (or the reference: Andreas Herrmann "using photolabile protecting groups for the controlled release of bioactive volatiles" in Photochemical & Photobiological Sciences, vol 11, n° 3, January 2012, page 446) describing a class of 2-oxoacetates capable of releasing perfuming aldehydes or ketones upon exposure to light and thus prolonging the effect of the perfuming ingredients as such. However, although said prior art compounds showed promising behaviour in laboratory tests, the latter have not yet materialized into commercial application in consumer products due to their chemical instability resulting from premature solvolysis (hydrolysis) of the ester moiety which significantly affects their performance in practical applications.

It is therefore desirable to create new systems capable of solving or at least reducing the above-cited problems and the present invention provides such a solution.

According to the invention, pro-fragrances are encapsulated into a microcapsule comprising a solid shell or membrane, which not only protects the pro-fragrance from its immediate environment, but also acts as a means for its controlled release by slowing down the diffusion of the precursor and/or the released fragrance out of the capsule.

We have now been able to establish that the encapsulation of photolabile 2-oxoacetate-based pro-fragrances into core-shell type microcapsules resulted in a significant increase in the long-lastingness of fragrance perception in practical applications. This effect is surprising because one might have expected that the unfavorable transparency of the capsule shell or wall to light would have reduced the efficiency of the photoreaction necessary to release the fragrance ingredient, i.e. the fragrant aldehyde or ketone, and thus reduced the amount of fragrance released over time. Unlike what might have been expected, we were able to establish that even freshly prepared capsules, where the hydrolysis of the precursor during storage is in principle not a problem, showed a significant increase in performance over the reference non-encapsulated pro-fragrance.

DESCRIPTION OF THE INVENTION

One object of the present invention is a core-shell microcapsule comprising:
a) a core of an oily phase containing at least one pro-fragrance ingredient which is a 2-oxoacetate derivative of formula

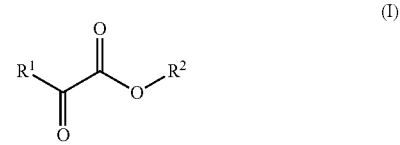

(I)

wherein, $R^1$ represents a linear, branched or cyclic, saturated or unsaturated $C_1$-$C_{16}$ hydrocarbon group, optionally substituted with one or two methoxy groups, and $R^2$ is a CH(R')(R'') group derived from the corresponding $C_{6-20}$ perfuming aldehyde of formula (R'')CHO (i.e. R' is H) or $C_{6-20}$ perfuming ketone of formula (R')(R'')C=O; and b) a shell surrounding said core and formed by interfacial polymerisation or by a phase separation process induced by polymerization.

Optionally, the microcapsules according to the invention may contain in their core an oily phase, in addition to the photolabile 2-oxoacetate ingredient, a suitable solvent, a perfume or an essential oil. Also, it goes without saying that one or more pro-fragrance ingredients of formula (I) may be encapsulated in the core-shell microcapsule.

For the sake of clarity, by the expression "core-shell microcapsule", or the similar, in the present invention it is meant that the microcapsule comprises an external solid oligomer-based shell or wall and an internal continuous oil phase enclosed by the external shell. In other words, encapsulates such as coacervates or extrudates (i.e. porous solid phases containing droplets of a liquid) are considered to be part of the invention.

According to preferred embodiments of the invention, $R^1$ represents a linear, branched or cyclic $C_1$-$C_{10}$ hydrocarbon group, optionally substituted with one or two methoxy groups, more preferably a linear, branched or cyclic $C_1$-$C_6$ hydrocarbon group. Amongst the latter, there can be cited the methyl, ethyl, tert-butyl and isopropyl groups, or even more preferably, a cyclopentyl or cyclohexyl group or a phenyl group optionally substituted with one or two methoxy groups.

The group $R^2$ is defined above as being derived from a perfuming aldehyde or ketone. An exhaustive list of said perfuming aldehydes or ketones is not warranted here, the person skilled in the art of perfumery being quite able to understand and know what is meant by a "perfuming aldehyde or ketone". A person skilled in the art may find a quite exhaustive list of perfuming compounds in references books (e.g. Perfume and Flavour Chemicals, by S. Arctander, Montclair N.J. (USA), 1969 or later editions), or in the patent literature. By way of example, some of such aldehydes and ketones are mentioned further on, although other such fragrant ingredients may also be used. It is useful to remind here that a perfuming ingredient is not a compound having just an odour, as mentioned further below.

The pro-fragrance (I) is able to release the fragrant aldehyde or ketone via the mechanism of release which is exemplified hereafter:

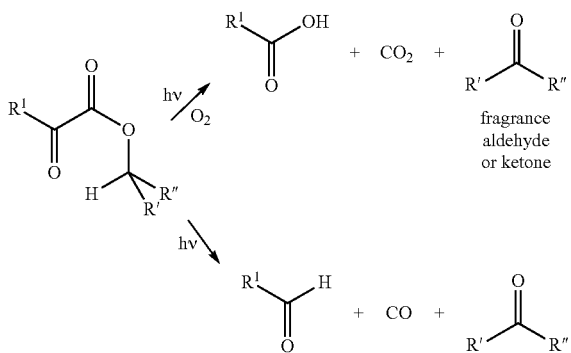

wherein the moiety (R')(R")CH—O (i.e. $OR^2$) is transformed into the perfuming aldehyde (R")CHO or ketone (R')(R")C=O, with simultaneous formation of a $R^1COOH$ residue. The photo-fragmentation mechanism is believed to be a photo-oxidation as generally described in the literature for 2-oxoacetates involving abstraction of the hydrogen from the (R')(R")CH—O moiety onto the 2-oxo group of the keto ester group as one of the key steps. Besides the desired perfuming aldehyde (R")CHO or ketone (R')(R")C=O, different reaction products can be formed, dependent on whether or not molecular oxygen reacts with one of the intermediate species.

In addition to the presence of light, which is mandatory, other environmental conditions, such as increased temperature, might of course also have an impact on the release efficiency of the perfuming aldehydes and ketones from their corresponding pro-fragrances.

Examples of perfuming aldehydes and ketones from which the $R^2$ group may be derived can be selected from the group of aldehydes consisting of benzaldehyde, 1,3-benzodioxol-5-carboxaldehyde (heliotropine), 3-(1,3-benzodioxol-5-yl)-2-methylpropanal, 3-(4-tert-butyl-1-cyclohexen-1-yl)propanal (Mugoxal®, origin: Firmenich SA, Geneva, Switzerland), 2,4-decadienal, 2-decenal, 4-decenal, 8-decenal, 9-decenal, 3-(6,6-dimethyl-bicyclo[3.1.1]hept-2-en-2-yl)propanal, 2,4-dimethyl-3-cyclohexene-1-carbaldehyde (Tripal®, origin: International Flavors & Fragrances, New York, USA), 3,5-dimethyl-3-cyclohexene-1-carbaldehyde, 1-(3,3-dimethyl-1-cyclohexyl)-1-ethanone, 5,9-dimethyl-4,8-decadienal, 3-(3,3- and 1,1-dimethyl-2,3-dihydro-1H-inden-5-yl)propanal, 2,6-dimethyl-5-heptenal (melonal), 3,7-dimethyl-2,6-octadienal (citral), 3,7-dimethyloctanal, 3,7-dimethyl-6-octenal (citronellal), (3,7-dimethyl-6-octenyl)acetaldehyde, 3-dodecenal, 4-dodecenal, 3-ethoxy-4-hydroxybenzaldehyde (ethyl vanillin), 4-ethyl benzaldehyde, 3-(2 and 4-ethylphenyl)-2,2-dimethylpropanal, 2-furancarbaldehyde (furfural), 2,4-heptadienal, 3,5,5,6,7,8,8-heptamethyl-5,6,7,8-tetrahydronaphthalene-2-carbaldehyde (Vulcanolide®, origin: Firmenich SA, Geneva, Switzerland), 4-heptenal, 2-hexenal, 3-hexenal, 2-hexyl-3-phenyl-2-propenal (hexylcinnamic aldehyde), 2-hydroxybenzaldehyde, 7-hydroxy-3,7-dimethyloctanal (hydroxycitronellal), 4-hydroxy-3-methoxybenzaldehyde (vanillin), 4- and 3-(4-hydroxy-4-methylpentyl)-3-cyclohexene-1-carbaldehyde (Lyral®, origin: International Flavors and Fragrances, New York, USA), 4-isopropylbenzaldehyde (cuminaldehyde), 8-isopropyl-6-methyl-bicyclo[2.2.2]oct-5-ene-2-carbaldehyde, 3-(4-isopropylphenyl)-2-methylpropanal, 2-(4-isopropylphenyl)propanal, 2- and 4-methoxybenzaldehyde (anis aldehyde), 6-methoxy-2,6-dimethylheptanal(methoxymelonal), 3-(2-methoxyphenyl)acrylaldehyde, 8(9)-methoxy-tricyclo[5.2.1.0(2,6)]decane-3(4)-carbaldehyde (Scentenal®, origin: Firmenich SA, Geneva, Switzerland), 4-methylbenzaldehyde, 3-(4-methylcyclohex-3-en-1-yl)butanal (Liminal®, origin: Firmenich SA, Geneva, Switzerland), 2-(4-methylenecyclohexyl)propanal, 1-methyl-4-(4-methyl-3-pentenyl)-3-cyclohexen-1-carbaldehyde (Precyclemone® B, origin: International Flavors & Fragrances, New York, USA), 3-(4-methyl-3-pentenyl)-3-cyclohexene-1-carbaldehyde, 4-(4-methyl-3-pentenyl)-3-cyclohexene-1-carbaldehyde (Acropal®, origin: Givaudan-Roure SA., Vernier, Switzerland), (4-methylphenoxy)acetaldehyde, (4-methylphenyl)acetaldehyde, 3-methyl-5-phenylpentanal (Phenexal®, origin: Firmenich SA, Geneva, Switzerland), 2-(1-methylpropyl)-1-cyclohexanone, 2-methyl-4-(2',2',3'-trimethyl-3'-cyclopentenyl)-4-pentenal, 2,4-nonadienal, 2,6-nonadienal, 2-nonenal, 3-nonenal, 6-nonenal, 8-nonenal, 2-octenal, 2-pentyl-3-phenyl-2-propenal, phenoxyacetaldehyde, 2-phenylacetaldehyde, 3-phenylbutanal (Trifernal®, origin: Firmenich SA, Geneva, Switzerland), 3-phenylpropanal, 2-phenylpropanal (hydratropaldehyde), 3-phenyl-2-propenal (cinnamic aldehyde), 4-(prop-1-en-2-yl)cyclohex-1-enecarbaldehyde (perillaldehyde), 3-(4-tert-butylphenyl)-2-methylpropanal (Lilial®, origin: Givaudan-Roure SA, Vernier, Switzerland), 3-(4-tert-butylphenyl)propanal (Bourgeonal®, origin: Quest International, Naarden, Netherlands), tricyclo[5.2.1.0(2,6)]decane-4-carbaldehyde, exo-tricyclo[5.2.1.0(2,6)]decane-8exo-carbaldehyde (Vertral®, origin: Symrise, Holzminden, Germany), 2,6,6-trimethyl-bicyclo[3.1.1]heptane-3-carbaldehyde (formyl pinane), 2,4,6- and 3,5,6-trimethyl-3-cyclohexene-1-carbaldehyde, 2,2,3-trimethyl-3-cyclopentene-1-acetaldehyde (campholenic aldehyde), 2,6,10-trimethyl-2,6,9,11-dodecatetraenal, 2,5,6-trimethyl-4-heptenal, 3,5,5-trimethylhexanal, 2,6,10-trimethyl-9-undecenal, 2-undecenal, 10-undecenal or 9-undecenal and their mixtures such as Intreleven aldehyde (origin: International Flavors & Fragrances, New York, USA) or Aldehyde Supra (origin: Firmenich SA, Geneva, Switzerland), an aldehyde of formula (R")CHO wherein R" is a linear or α-branched alkyl group of $C_6$ to $C_{15}$; and any mixture of the above-cited aldehydes, or from the group of ketones consisting of a damascenone, a damascone, a ionone or methyl ionone (such as Iralia® Total, origin: Firmenich SA, Geneva, Switzerland), irone, macrocyclic ketone such as, for example, cyclopentadecanone (Exaltone®) or 3-methyl-4-cyclopentadecen-1-one and 3-methyl-5-cyclopentadecen-1-one (Delta Muscenone) or 3-methyl-1-cyclopentadecanone (Muscone) all from Firmenich SA, Geneva, Switzerland, 1-(2-aminophenyl)-1-ethanone, 1-(3,3-dimethyl-1-cyclohexen-1-yl)-4-penten-1-one, 1-(5,5-dimethyl-1-cyclohexen-1-yl)-4-penten-1-one (Neobutenone®, origin: Firmenich SA, Geneva, Switzerland), 1-(3,3-dimethyl-1-cyclohexyl)-1-ethanone, 2,5-dimethyl-2-octene-6-one, 4,7-dimethyl-6-octene-3-one, (3,7-dimethyl-6-octenyloxy)acetaldehyde, 1-(2,4-dimethylphenyl)-1-ethanone, 4-(1,1-dimethylpropyl)-1-cyclohexanone (Orivone®, origin: International Flavors & Fragrances, New York, USA), 2,4-di-tert-butyl-1-cyclohexanone, ethyl 4-oxopentanoate, 1-(4-ethylphenyl)-1-ethanone, 1-(3,5,5,6,8,8-hexamethyl-5,6,7,8-tetrahydronaphthalen-2-yl)ethanone (Fixolide®, origin: Givaudan-Roure SA, Vernier, Switzerland), 2-hexyl-1-cyclopentanone, 2-hydroxy-3-methyl-2-cyclopenten-1-one, 4-(4-hydroxy-1-phenyl)-2-butanone (raspberry ketone), 1-(2- and 4-hydroxyphenyl)-1-ethanone, 2-isopropyl-5-methylcyclohexanone (menthone), 4-isopropyl-2-cyclohexen-1-one, 1-(5-isopropyl-2-methylcyclohex-1- or 2-en-1-yl)propanone, 1-(4-isopropyl-1-phenyl)-1-ethanone, 2-(2-mercaptopropan-2-yl)-5-methylcyclohexanone, 1-(4-methoxyphenyl)-1-ethanone, 7-methyl-2H,4H-1,5-benzodioxepin-3-one (Calone®, origin: C.A.L. SA, Grasse, France), 5-methyl-3-heptanone, 6-methyl-5-hepten-2-one, methyl 3-oxo-2-pentyl-1-cyclopentaneacetate (Hedione®, origin: Firmenich SA, Geneva, Switzerland), 1-(4-methylphenyl)-1-ethanone(4-methylacetophenone), 5-methyl-2-(propan-2-ylidene)cyclohexanone, 5-methyl-2-(prop-1-en-2-yl)cyclohexanone (isopulegone), 2-methyl-5-(prop-1-en-2-yl)cyclohex-2-enone (carvone), 5-methyl-exo-tricyclo[6.2.1.0(2,7)]undecan-4-one, 3-methyl-4-(1,2,2-trimethylpropyl)-4-penten-2-one, 2-naphthalenyl-1-ethanone, 1-(octahydro-2,3,8,8-tetramethyl-2-naphthalenyl)-1-ethanone (isomeric mixture, Iso E Super, origin: International Flavors & Fragrances, New York, USA), 3,4,5,6,6-pentamethyl-3-hepten-2-one, 2-pentyl-1-cyclopentanone (Delphone, origin: Firmenich SA, Geneva, Switzerland), 4-phenyl-2-butanone (benzylacetone), 1-phenyl-1-ethanone (acetophenone), 2- and 4-tert-butyl-1-cyclohexanone, 1-(4-tert-butylphenyl)-1-ethanone), 3,5,6,6-tetramethyl-4-methyleneheptan-2-one, 2,4,4,7-tetramethyl-6-octen-3-one, 1,7,7-trimethyl-bicyclo[2.2.1]heptan-2-one (camphor), 2,6,6-trimethyl-1-cycloheptanone, 2,6,6-trimethyl-2-cyclohexene-1,4-dione, 4-(2,6,6-trimethyl-2-cyclohexen-1-yl)-2-butanone (dihydroionone), 1-(2,4,4-trimethyl-2-cyclohexen-1-yl)-2-buten-1-one, 1-(3,5,6-trimethyl-3-cyclohexen-1-yl)-1-ethanone, 2,2,5-trimethyl-5-pentyl-1-cyclopentanone or a $C_{6-15}$ ketone of formula (R')(R")C=O wherein R' and R" are linear alkyl groups; and any mixture of the above-cited ketones, or from the group consisting of any mixture of the above-cited aldehydes and ketones.

The pro-fragrances of formula (I) can be prepared by generally known methods reported in the literature or, as described in WO 99/60990, belonging to the present applicant. For example, pro-fragrances of formula (I) can be obtained by esterification of a 2-oxoacetic acid with a corresponding alcohol, by transesterification of 2-oxoacetates, such as the methyl or ethyl 2-oxoacetates, with a corresponding alcohol or even by Grignard reaction of a bromo-substituted hydrocarbon with a corresponding dialkyl oxalate. Alternatively, pro-fragrances of formula (I) can also be obtained by oxidation of 2-hydroxyacetates.

It is convenient to prepare pro-fragrances of formula (I) from the primary) [(R")CH$_2$—OH] or secondary [(R')(R") CH—OH] alcohols of the corresponding aldehydes [(R") CHO] or ketones [(R')(R")C=O] to be released. These primary or secondary alcohols can be obtained by reduction of the corresponding aldehydes or ketones, e.g. by reaction with LiAlH$_4$. As a result of the specific mechanism of release, which has been exemplified above, the 2-oxoacetate pro-fragrances of formula (I) generate the corresponding aldehydes and ketones upon exposure to light.

Examples of 2-oxoacetates corresponding to formula (I) can be selected from the group consisting of 3-(4-tert-butyl-1-cyclohexen-1-yl)propyl 2-oxo-2-phenylacetate, 3-(4-tert-butylphenyl)-2-methylpropyl 2-cyclohexyl-2-oxoacetate, 3-(4-(tert-butyl)phenyl)-2-methylpropyl 2-oxo-2-phenylacetate, decyl 2-cyclohexyl-2-oxoacetate, decyl 2-oxo-2-phenylacetate, (2,4-dimethyl-3-cyclohexen-1-yl)methyl 2-cyclohexyl-2-oxoacetate, (2,4-dimethyl-3-cyclohexen-1-yl) methyl 2-oxo-2-phenylacetate, 1-(3,3- and 5,5-dimethyl-1-cyclohexen-1-yl)-4-pentenyl 2-oxo2-phenylacetate, 3-(3,3- and 1,1-dimethyl-2,3-dihydro-1H-inden-5-yl)propyl 2-oxo-2-phenylacetate, 2,6-dimethyl-5-heptenyl 2-oxo-2-phenylacetate, 3,7-dimethyl-2,6-octadienyl 2-cyclohexyl-2-oxoacetate, 3,7-dimethyl-2,6-octadienyl 2-(4-methylcyclohexyl)-2-oxoacetate, 3,7-dimethyl-2,6-octadienyl 3-methyl-2-oxopentanoate, 3,7-dimethyl-2,6-octadienyl 2-oxo-2-phenylacetate, 3,7-dimethyl-2,6-octadienyl 2-oxopropanoate, 3,7-dimethyl-6-octenyl 2-(4-acetylphenyl)-2-oxoacetate, 3,7-dimethyl-6-octenyl(bicyclo[2.2.1] hept-2exo-yl)oxoacetate, 3,7-dimethyl-6-octenyl 2-cyclohexyl-2-oxoacetate, 3,7-dimethyl-6-octenyl 2-cyclopentyl-2-oxoacetate, 3,7-dimethyl-6-octenyl 2-(4-methylcyclohexyl)-2-oxoacetate, 3,7-dimethyl-6-octenyl[4-(2-methyl-1,3-dioxolan-2-yl)phenyl]oxoacetate, 3,7-dimethyl-6-octenyl 3-methyl-2-oxopentadecanoate, 3,7-dimethyl-6-octenyl 3-methyl-2-oxopentanoate, 3,7-dimethyl-6-octenyl 2-oxobutanoate, 3,7-dimethyl-6-octenyl 2-oxohexadecanoate, 3,7-dimethyl-6-octenyl 2-oxopentanoate, 3,7-dimethyl-6-octenyl 2-oxo-2-phenylacetate, 3,7-dimethyl-6-octenyl 2-oxopropanoate, 4-(1,1-dimethylpropyl)-1-cyclohexyl 2-cyclohexyl-2-oxoacetate, 4-dodecenyl 2-oxo-2-phenylacetate, 3,5,5,6,7,8,8-heptamethyl-5,6,7,8-tetrahydronaphthalen-2-yl)methyl 2-oxo-2-phenylacetate, 1-(3,5,5,6,8,8-hexamethyl-5,6,7,8-tetrahydro-2-naphthalenyl)ethyl 2-oxo-2-phenylacetate, 3-hexenyl 2-oxo-2-phenylacetate, 3-hexenyl 2-oxopropanoate, 7-hydroxy-3,7-dimethyloctyl 2-oxo2-phenylacetate, [4- and 3-(4-hydroxy-4-methylpentyl)-3-cyclohexen-1-yl]methyl 2-oxo-2-phenylacetate, 2-isopropyl-5-methylcyclohexyl 2-cyclohexyl-2-oxoacetate, 2-isopropyl-5-methylcyclohexyl 2-oxo-2-phenylacetate, 4-methoxybenzyl 2-cyclohexyl-2-oxoacetate, [4- and 3-(4-methyl-3-pentenyl)-3-cyclohexen-1-yl]methyl 2-oxo-2-phenylacetate, 3-methyl-5-phenylpentyl 2-oxo-2-phenylacetate, 2-methyl-4-(2',2',3'-trimethyl-3'-cyclopenten-1'-yl)-4-pentenyl 2-oxo-2-phenylacetate, 2,6-nonadienyl 2-oxo-2-phenylacetate, 3-nonenyl 2-oxo-2-phenylacetate, 2-pentyl-1-cyclopentyl 2-cyclohexyl-2-oxoacetate, 4-phenylbutan-2-yl 2-oxo-2-phenylacetate, 2-phenylethyl 2-oxo-2-phenylacetate, 2-phenylethyl 2-oxopropanoate, 3,5,6,6-tetramethyl-4-methyleneheptan-2-yl 2-oxo-2-phenylacetate, 4-(2,6,6-trimethyl-2-cyclohexenyl)-3-buten-2-yl 2-oxo-2-phenylacetate, 9-undecenyl 2-oxo-2-phenylacetate or 10-undecenyl 2-oxo-2-phenylacetate.

In all aspects of the above-described invention the invention's core-shell microcapsules might be used in the presence of other fragrance delivery systems, in particular in the presence of other non-encapsulated fragrance delivery systems, such as the light-sensitive 2-oxoacetates mentioned in WO 99/60990, or other light-sensitive fragrance precursors.

As mentioned above, a perfume co-ingredient, as well as solvents and adjuvants of current use in perfumery, may be further contained in the oily phase of the microcapsules according to the invention.

For the purpose of the present invention, "perfume" means a single perfuming ingredient or a mixture of ingredients, in the form of a perfuming composition. By "perfuming ingredients" it is understood here compounds which are used as active ingredients in perfuming preparations or compositions in order to impart a hedonic effect when applied to a surface. In other words, such compounds, to be considered as being perfuming ones, must be recognized by a person skilled in the art of perfumery as being able to impart or modify in a positive or pleasant way the odor of a composition or of an article or surface, and not just as having an odor. Moreover, this definition is also meant to include compounds that do not necessarily have an odor but are capable of modulating the odor of a perfuming composition, perfumed article or surface and, as a result, of modifying the perception by a user of the odor of such a composition, article or surface.

In general terms, these perfuming ingredients belong to chemical classes as varied as alcohols, lactones, aldehydes, ketones, esters, ethers, acetates, nitriles, terpenoids, nitrogenous or sulphurous heterocyclic compounds and essential oils, and said perfuming ingredients can be of natural or synthetic origin. Specific examples of such perfuming ingredients can be found in the current literature, for example in Perfume and Flavour Chemicals, by S. Arctander, Montclair N.J. (USA), 1969 (and later editions), as well as in the vast patent and other literature related to the perfume industry. They are well known to the person skilled in the art of perfuming consumer products, that is, of imparting a pleasant odour to a consumer product.

By "suitable solvent" we mean here a material which is practically neutral from a perfumery point of view, i.e. that does not significantly alter the organoleptic properties of perfuming ingredients and is generally not miscible with water, i.e. possesses a solubility in water below 10%, or even below 5%. Solvents commonly used in perfumery, such as for example dipropyleneglycol, diethyl phthalate, isopropyl myristate, benzyl benzoate, 2-(2-ethoxyethoxy)-1-ethanol or ethyl citrate, limonene or other terpenes, isoparaffins such as those known under the trademark Isopar® (origin: Exxon Chemical) or glycol ethers and glycol ether esters such as those known under the trademark Dowanol® (origin: Dow Chemical Company), are suitable solvents for the purposes of the invention.

By "perfumery adjuvant" we mean here an ingredient capable of imparting additional added benefits such as a color, chemical stability, etc. A detailed description of the nature and type of adjuvant commonly used in perfuming bases cannot be exhaustive, but it has to be mentioned that said ingredients are well known to a person skilled in the art.

The component b) of the microcapsules according to the invention is an interfacial shell that can be obtained by a variety of processes.

According to certain embodiments of the invention, such a shell is preferably obtained by a phase separation process induced by polymerization. Many such processes have been described in the prior art. This process can, for example, be based on amino resins produced by the polycondensation of an aldehyde (e.g. formaldehyde, 2,2-dimethoxyethanal, glyoxal, glyoxylic acid or glycolaldehyde and mixtures thereof) with an amine, namely urea, benzoguanamine, glycoluryl, melamine, methylol melamine, methylated methylol melamine, guanazole and the like, as well as mixtures thereof. Examples for suitable ureas are dimethylol urea, methylated dimethylol urea, urea-resorcinol, and mixtures thereof.

Some of the seminal literature related to encapsulation of perfumes by polycondensation of amino resins, namely melamine based resins, with aldehydes is represented by articles such as those published by K. Dietrich et al. in Acta Polymerica, 1989, vol. 40, pages 243, 325 and 683, as well as 1990, vol. 41, page 91. Such articles already describe the various parameters affecting the preparation of such core-shell microcapsules following prior art methods that are also further detailed and exemplified in the patent literature. U.S. Pat. No. 4,396,670, to the Wiggins Teape Group Limited is a pertinent early example of the latter. Since then many other authors and creators have enriched the literature in this field and it would be impossible to cover all published developments here, but the general knowledge in this type of encapsulation is very significant. More recent publications of pertinency, which also address the useful uses of such microcapsules, are represented for example by the article of H. Y. Lee et al., in J. Microencapsulation, 2002, vol. 19, pages 559-569, international patent publication WO 01/41915 or yet the article of S. Bône et al. in Chimia, 2011, vol. 65, pages 177-181.

The polycondensation of an aldehyde with an amine or an amino resin leads to shells or walls consisting of highly crosslinked resins known as thermoset resins. Suitable alkylolated polyamines for the microcapsules according to the invention encompass mixtures of mono- or polyalkylolated polyamines, which in turn may be partially alkylated with alcohols having from 1 to 6 methylene units, and also encompass mono- or polymethylolmelamine and/or mono- or polymethylolurea precondensates, such as those commercially available under the trademark Urac® (origin: Cytec Technology Corp.), Cymel® (origin: Cytec Technology Corp.), Urecoll® or Luracoll® (origin: BASF).

Other suitable amino resins from the mixtures of mono- or polyalkylolated polyamines can be obtained by polycondensation of an aldehyde such as 2,2-dimethoxyethanal, glyoxal, glyoxylic acid or glycolaldehyde and mixtures thereof, and an amine Non-limiting examples of polyalkylolated polyamines from the polycondensation with 2,2-dimethoxyethanal comprise poly[N-(2,2-dimethoxy-1-hydroxy)]polyamines, mono- and di-[N-(2,2-dimethoxy)-1-hydroxy)]urea, mono-, di-, tri-, and/or tetra-[N-(2,2-dimethoxy)-1-hydroxy)] melamine, tetra-[N-(2,2-dimethoxy)-1-hydroxy)]glycouryl or di-[N-(2,2-dimethoxy)-1-hydroxy)]benzoguanidine. Non-limiting examples of polyalkylolated polyamines from the polycondensation with glyoxal comprise poly[N-(2-hydroxyacetaldehyde)]polyamines, mono- and di-[N-(2-hydroxyacetaldehyde)]urea, mono-, di-, tri-, and/or tetra-[N-(2-hydroxyacetaldehyde)]melamine, tetra-[N-(2-hydroxyacetaldehyde)]glycouryl or di-[N-(2-hydroxyacetaldehyde)]benzoguanidine. Non-limiting examples of polyalkylolated polyamines from the polycondensation with glyoxylic acid comprise poly[N-(2-hydroxyacetic acid)]polyamines, mono- and di-[N-(2-hydroxyacetic acid)]urea, mono-, di-, tri-, and/or tetra-[N-(2-hydroxyacetic acid)]melamine, tetra-[N-(2-hydroxyacetic acid)]glycouryl or di-[N-(2-hydroxyacetic acid)]benzoguanidine. Non-limiting examples of polyalkylolated polyamines from the polycondensation with glycolaldehyde comprise poly[N-(ethane-1,2-diol)]polyamines, mono- and di-[N-(ethane-1,2-diol)] urea, mono-, di-, tri-, and/or tetra-[N-(ethane-1,2-diol)] melamine, tetra-[N-(ethane-1,2-diol)]glycouryl or di-[N-(ethane-1,2-diol)]benzoguanidine.

According to an embodiment of the invention, core-shell microcapsules are obtained by interfacial polymerization, in which the core is encapsulated into a crosslinked polyurea or polyurethane shell or wall formed by reaction of an amino resin, a polyamine or polyol with at least one polyisocyanate.

A polyurea microcapsule shell or wall is formed when a polyamine or an amino resin is used. Particularly efficient polyamines are water soluble guanidine salts and/or guanidine and/or amino resins such as those described above. By "water soluble guanidine salt" it is meant a salt soluble in water and resulting from the reaction of guanidine with an acid. One example of such salts is guanidine carbonate.

In the case where a polyol is used as the cross-linker, a polyurethane microcapsule shell or wall is formed. As polyol, glycerol is preferred.

The use of specific proportions of polyisocyanate versus polyamine or polyol is advantageous. Therefore, preferably, for each mole of isocyanate group, 1 to 10, preferably 2 to 5 moles of amine or alcohol groups are present. Accordingly, there is added an excess of the cross-linking agent.

The specific composition of the polyalkylolated polyamine shell or the polyurea or polyurethane shell is key in obtaining microcapsules that are at the fine balance between release and retention so as to achieve satisfactory slow and constant release of the pro-fragrances, and eventually of any fragrance ingredients over time, once the microcapsules are placed on textiles, skin or hair, while showing the desired stability of the perfume retention in the product base (e.g. counteracts efficiently the extraction of the perfume by the surfactants of the consumer product). The selection of the polyalkylolated polyamines, or the selection of the polyamine or polyol and of the polyisocyanate, among the ones mentioned above, enable the fine tuning of the properties and stability of the capsules.

When a polyisocyanate compound is reacted with an amino resin, a polyamine or a polyol, any polyisocyanate is suitable for the reaction, but a polyisocyanate comprising at least two isocyanate groups or at least three isocyanate groups is preferred. Low volatility polyisocyanate molecules are preferred because of their low toxicity. In particular, the polyisocyanate can advantageously be selected from the group consisting of a trimer of hexamethylene diisocyanate, a trimer of isophorone diisocyanate or xylylene diisocyanate or a Biuret of hexamethylene diisocyanate or a trimer of xylylene diisocyanate with trimethylolpropane (known with the tradename of Takenate®, origin: Mitsui Chemicals, among which a trimer of xylylene diisocyanate with trimethylolpropane and a Biuret of hexamethylene diisocyanate are even more preferred.

The phase separation process induced by polymerization and the interfacial polymerization process described above essentially convert emulsions, consisting of a dispersed oil phase containing the pro-fragrance to be encapsulated and a continuous water phase, into a dispersion of solid beads consisting of a core surrounded by a shell, whose permeability depends on a number of factors, including the extent of cross-linking, and/or the thickness of the shell.

According to certain embodiments of the invention, the microcapsules obtained either by phase separation polycondensation or by interfacial polymerization have a shell thickness varying between 10 to 1000 nm, preferably between 20 and 500 nm, even more preferably between 25 and 350 nm. As an example, the capsule's shell thickness can be determined by atomic force microscopy (AFM).

According to a particular embodiment of the invention, said shell or microcapsule is a diffusive one.

For the sake of clarity, by the expression "diffusive", or the similar, in the present invention it is meant that the shell of the microcapsule is permeable to the free perfuming aldehyde or ketone, which has been released from a pro-fragrance of formula (I) inside the microcapsule after exposure to light, but forms an efficient barrier strongly limiting or suppressing the diffusion of the pro-fragrance of formula (I) out of the microcapsule.

Alternatively, said shell or microcapsule is considered as being "non-diffusive" if the free perfuming aldehyde or ketone generated inside the microcapsule by exposure of the encapsulated pro-fragrance of formula (I) to light is only released after rubbing and/or other means of mechanically breaking the microcapsule shell. In such a case the interest of using an encapsulated pro-fragrance of formula (I) according to the invention is to provide, after rubbing, a burst effect of perfume release (as the result of the evaporation of the free ingredients in the capsules, combined with a prolonged perfuming effect resulting from the light-induced cleavage of the pro-fragrance of formula (I)).

The diffusivity of a microcapsule can thus be determined by comparing the amount of perfuming aldehyde or ketone released from an encapsulated pro-fragrance of formula (I) after exposure to light with the amount of perfuming aldehyde or ketone released from an equimolar quantity of a non-encapsulated pro-fragrance of formula (I) treated under the same conditions. The amount of perfuming aldehyde or ketone can hereby, for example, be determined by sensory analysis or by headspace sampling and it can be expressed in terms of (perceived) intensities or as headspace concentrations.

If the amount of perfuming aldehyde or ketone released from the encapsulated pro-fragrance of formula (I) is equivalent to or higher than that of the perfuming aldehyde or ketone released from the non-encapsulated pro-fragrance of formula (I), the microcapsules are considered as being diffusive. Similarly, if the amount of perfuming aldehyde or ketone released from the encapsulated pro-fragrance of formula (I) is lower than that released from the non-encapsulated pro-fragrance of formula (I), the microcapsules are considered as being non-diffusive.

Alternatively, according to a particular embodiment of the invention, said shell or microcapsule is a non diffusive one. Indeed such non diffusive microcapsule can be used to provide a burst effect after rubbing, which cannot be obtained with the pure ingredient encapsulated or with the non-encapsulated compound (I).

According to a particular embodiment of the invention, one may use a mixture of microcapsules according to the present invention wherein one part has a diffusive shell and another part has a non-diffusive shell.

In the case of a diffusive shell or microcapsule, the diffusive properties can be linked to the capsule diameter, and the thickness and/or the composition of the shell. For instance, in the case of microcapsules having a shell which is a melamine based resin, diffusive microcapsules are obtained with a concentration of resin at around 3.20 wt % in the dispersion and a diameter of about 11 microns.

In the case of microcapsules having a shell which is a polyurea, diffusive microcapsules are, for example, obtained with a shell thickness below 150 nm; in this case the shell is composed of an aliphatic isocyanate and guanidine carbonate is used as the only amino compound.

For the sake of clarity, by the expression "dispersion", in the present invention, it is meant a system in which particles are dispersed in a continuous phase of a different composition, and this term specifically includes a suspension or an emulsion.

A polymeric stabilizer can be used to prevent the microcapsules from agglomerating, thus acting as a protective colloid which is added to the monomer mixture, intended to form the shell, prior to polymerization. For the sake of clarity, in the present context by the expression "stabilizer", or similar, it is understood the meaning usual in the art, i.e. a compound that is capable of, or is added to, stabilize the system, e.g. to prevent aggregation or agglomeration of the microcapsules, for example in the consumer product application or during the process for the microcapsule preparation. The use of said stabilizer is standard knowledge to the person skilled in the art.

For the purpose of the present invention, said stabilizer can be an ionic or non-ionic surfactant or a colloidal stabilizer. The exact nature of such stabilizers is well known to a person skilled in the art. As non-limiting examples one may cite the following stabilizers: non-ionic polymers such as polyvinyl alcohol (Mowiol 18-88, Origin: Fluka), cellulose derivatives such hydroxyethyl cellulose or carboxymethyl cellulose such as Ambergum™ 1221 (origin: Aqualon Hercules), polyethylene oxide, co-polymers of polyethylene oxide and polyethylene or polypropylene oxide, co-polymers of alkyl acrylates and N-vinylpyrrolidone; ionic polymers such as acrylic copolymers of acrylamide and acrylic acid such as Alcapsol® 144 (origin: Ciba), e.g. acid/acrylamide copolymers produced from a monomer mixture of acrylic acid and acrylamide wherein the acrylic acid content is in the range of from 20 to 80%, acid anionic surfactants (such as sodium dodecyl sulfate), acrylic co-polymers bearing a sulfonate group (such as sodium poly(styrene sulfonate), and co-polymers of vinyl ethers and maleic anhydride.

If the pro-fragrance to be encapsulated by an interfacial polymerization process is hydrophobic (e.g. with the logarithm of its octanol/water partition coefficient (log P)>1, preferably >2), it will be included in the water-immiscible phase, whereafter the two phases are mixed by high shear mixing to form an oil-in-water emulsion. In this emulsion, the polycondensation reaction will take place at the interface between the two phases. Thus, the oil droplets will be surrounded by the microcapsule shell formed by the interfacial polycondensation.

It has been found that polyurea or polyurethane microcapsules are very suitable for carrying various kinds of hydrophobic benefit agents, such as pro-fragrances.

Optionally, the microcapsules may be coated with a cationic copolymer. The cationic polymer allows partial or complete neutralization of the negative electrical charge borne by the microcapsules, or even the conversion of the negatively-charged microcapsules into positively-charged microcapsules. To this effect, according to the invention, preferred cationic polymers comprise cationic polyacrylates and acrylamides such as Salcare® SC60 (origin: BASF), cationic cellulose derivatives, such as those available under the trademark Ucare® (origin: Amerchol), and quaternized guar gums available under the trademark Jaguar® (origin: Rhodia). Other cationic compounds that can be used include the polyquaternium compounds, all which have a plurality of quaternary ammonium groups, or polymeric species such as diallyl dimethyl ammonium chloride/acrylamide polymers such as those available under the trade name Merquat® (origin: Nalco).

The microcapsules of the present invention are provided in the form of aqueous slurries, having typically 20 to 55% of solid content, where the term "solid content" is relative to the total weight of the microcapsules. Alternatively, such slurries may be spray-dried in a generally known manner to provide powder products.

The slurry may contain formulation aids, such as stabilizing and viscosity control hydrocolloids, biocides, and, as the case may be, formaldehyde scavengers.

The aqueous phase can also advantageously comprise hydrophilic inorganic particles such as silica particles or titanium oxide, in order to adjust the density of the microcapsules. By doing so, the density of the microcapsules can be brought to a value similar to that of the end product into which it is intended to incorporate them and therefore the microcapsules are maintained homogeneously suspended and dispersed in such liquid products. This is particularly advantageous in perfuming microcapsules because the specific gravity of the perfuming ingredients is usually lower than 1 g/ml.

The average size of the microcapsules may range between 1 micrometer to 100 micrometers, or even more, depending on the mixing shear stress applied to the system during microcapsule formation. The selection of the most appropriate range and distribution of size depends on the application for which the microcapsules are intended, and can be controlled and adjusted by the skilled person as a function of the latter. In a general manner the average size of the microcapsules according to the invention ranges between 1 micrometer and 600 micrometers and, more preferably, comprises a range of 1 to 200 micrometers.

The microcapsules of the present invention are characterized by a nominal shell to core mass ratio lower than 20%, preferably lower than 10% and, most preferably, lower than 7%, the invention thus providing thin and frangible shells that allow the diffusion of the fragrance molecules resulting from the degradation of the pro-fragrance.

The nominal shell to core mass ratio depends on the amount of amino resin or polyamine or polyol and/or polyisocyanate used for the preparation of the microcapsules (and thus the shell thickness of the capsule) and which has a strong influence on the performance of the delivery system. An optimum value to reach a maximum of capsule stability and the best release performance has to be reached. Specific examples according to the invention are presented further on. As an example, the nominal shell to core mass ratio can vary from 0.3 to 0.01, preferably from 0.2 to 0.05, most preferably from 0.15 to 0.06.

The microcapsules according to the invention protect the pro-fragrance against premature solvolysis (hydrolysis) during storage in the application formulation and increase the deposition of the pro-fragrance on the target substrate once the latter is treated with the consumer product.

The microcapsules can be used as such for the controlled release of the photolabile pro-fragrance, and possibly that of the perfume co-ingredient.

Furthermore, the invention's core-shell microcapsules can also be advantageously used in all the fields of modern perfumery, i.e. fine or functional perfumery, to positively impart or modify the odor of a consumer product into which said invention's microcapsules are added.

Consequently, a consumer product which comprises:
i) as perfuming ingredient, at least one invention's microcapsule, as defined above; and
ii) a consumer product base;
is also an object of the present invention.

Such consumer product may be a solid or a liquid product. According to a particular embodiment, liquid products are preferred.

For the sake of clarity, by "consumer product" it is meant a consumer product which is typically perfumed and which is expected to deliver at least a perfuming effect, in other words it is a perfumed consumer product.

For the sake of clarity, by "consumer product base" we mean here a base formulation that is compatible with perfuming ingredients, and in particular with the perfume microcapsules according to the invention, comprising the photolabile pro-fragrance of formula (I), and is expected to deliver a pleasant odor to a surface to which it is applied (e.g. skin, hair, textile, or hard surface). In other words, a perfumed consumer product according to the invention comprises the unperfumed base functional formulation, corresponding to the desired consumer product, e.g. a detergent, a fabric softener, or an air freshener, for example, and an olfactive effective amount of the microcapsules according to the present invention. It goes without saying that such a consumer product may also contain non-encapsulated perfume, i.e. perfume ingredients in free form.

The nature and type of the constituents of the consumer product base do not warrant a more detailed description here, which in any case would not be exhaustive, the skilled person being able to select them on the basis of his general knowledge and according to the nature and the desired effect of said product.

Non-limiting examples of consumer products in which the microcapsules according to the invention can be used advantageously include perfumes, colognes or after-shave lotions; fabric care products, such as a liquid or solid detergents, fabric softeners or refreshers, ironing waters, tissues or other paper or cellulose based products such as nappies, and bleaches or home care products, including window and kitchen cleaners; body and hair care products (e.g. a shampoos, coloring preparations, conditioners and hair sprays), cosmetic preparations (e.g. creams, body deodorants or antiperspirants), or skin-care products (e.g. a perfumed soap, shower or bath mousse, oils or gels, or a hygiene product); an air care product, such as an air freshener or a "ready to use" powdered air freshener; or a home care product, such as a wipe, a dish detergent or hard-surface detergent.

As anticipated above, the invention's composition can be advantageously used for bringing a benefit to consumer products, such as its perfuming effect. Because some of the volatile $C_{6-20}$ perfuming aldehydes and $C_{6-20}$ perfuming ketones described above can also have insect attractant or repellent, pharmaceutical, bactericide, fungicide or malodor counteracting properties, it is evident that the invention's microcapsules can also be used in formulations serving for insect attractant or repellent, pharmaceutical, bactericide, fungicide or malodor counteracting purposes. Indeed, said microcapsules, possess several other properties that make it particularly suitable for this purpose.

The proportions in which the microcapsules according to the invention can be incorporated into the various aforementioned consumer products vary within a wide range of values. These values are dependent on the nature of the article to be perfumed and on the desired organoleptic effect as well as the nature of the co-ingredients in a given consumer product base. Typically, the consumer products comprise, based on the total consumer product weight, from about 0.01% to about 80% by weight, of microcapsules according to the present invention. Preferably the consumer products comprise from about 0.01% to about 30% of microcapsules. More preferably the consumer products comprise from about 0.1% to about 15% of microcapsules.

Formulations of consumer product bases in which the microcapsules of the invention can be incorporated can be found in the abundant literature relative to such products. These formulations do not warrant a detailed description here, which would in any case not be exhaustive. The person skilled in the art of formulating such consumer products is perfectly able to select the suitable components on the basis of his general knowledge and of the available literature. In particular, examples of such formulations can be found in the patents and patent applications relative to such products, for example in WO 2008/016684 (pages 10 to 14), in US 2007/0202063 (paragraphs [0044] to [0099]), in WO 2007/062833 (pages 26 to 44), in WO 2007/062733 (pages 22 to 40), in WO 2005/054422 (pages 4 to 9), in EP 1741775, in GB 2432843, in GB 2432850, in GB 2432851 or in GB 2432852.

Another object of the present invention is a method for intensifying or prolonging the diffusion effect of the characteristic fragrance of a perfume ingredient on a surface, characterized in that said surface is, preferentially in the presence of light, treated with
a) a microcapsule of the invention, as defined above, containing at least one pro-fragrance compound of formula (I);
b) a perfuming composition of the invention, as defined above, comprising the microcapsule of a); or
c) a perfumed consumer product, as defined above, comprising the microcapsule of a);

under conditions which are susceptible of allowing the release of at least the aldehyde and/or ketone corresponding to the pertinent pro-fragrance (I).

Suitable surfaces for such treatment are in particular textiles, hard surfaces, hair and skin.

BRIEF DESCRIPTION OF THE DRAWINGS

FIG. 1: Shell thickness of microcapsules A4, B4 and C4 as a function of diameter and polyurea concentration measured by AFM.

FIG. 2: Dynamic headspace analysis for the evaporation of pure 2-phenylacetaldehyde or decanal, or of 2-phenylacetaldehyde or decanal released from microcapsules A4 or E10, respectively, according to the invention, or of 2-phenylacetaldehyde and decanal released from the corresponding prior-art 2-oxo-2-phenylacetates in an all purpose surface cleaner application.

EXAMPLES

The invention is hereafter described in more detailed manner by way of the following examples, wherein the abbreviations have the usual meaning in the art, temperatures are indicated in degrees centigrade (° C.). NMR spectral data were recorded on a Bruker AMX 360 or 400 spectrometer in $CDCl_3$ at 360 or 400 MHz for $^1H$ and at 90.6 or 100.6 MHz for $^{13}C$, the chemical displacements δ are indicated in ppm with respect to $Si(CH_3)_4$ as the standard, the coupling constants J are expressed in Hz (br.=broad peak). Commercially available reagents and solvents were used without further purification if not stated otherwise. Reactions were carried out in standard glassware under $N_2$.

Although specific conformations or configurations are indicated for some of the compounds, this is not meant to limit the use of these compounds to the isomers described. According to the invention, all possible conformation or configuration isomers are expected to have a similar effect.

General Method for the Reduction of Aldehydes or Ketones

A solution the fragrance aldehyde or ketone (ca. 10 g) in ether (75 ml) was added dropwise to a stirred suspension of $LiAlH_4$ (1 eq.) in ether (80-200 ml) at 0° C. The reaction mixture was left warming up to room temperature and then heated under reflux for 20-60 min After cooling to 0° C., the remaining $LiAlH_4$ was quenched with water (and in some cases a small amount of NaOH (10%) and water was added). The formation of a white precipitate was observed which was filtered off. The organic phase was washed with water, dried ($Na_2SO_4$) and concentrated to give the desired primary or secondary alcohol.

Preparation of (Z)-4-dodecanol

As described above from (Z)-4-dodecanal to give 10.00 g (98%) of a colorless oil.

$^1$H-NMR (360 MHz): δ 5.46-5.32 (m, 2H); 3.65 (t, J=6.5, 2H); 2.12 (q, J=6.9, 2H); 2.03 (q, J=6.6, 2H); 1.68 (s, 1H); 1.63 (quint., J=6.9, 2H); 1.40-1.20 (m, 10H); 0.88 (t, J=6.7, 3H).

$^{13}$C-NMR (90.6 MHz): δ 130.84 (d); 128.85 (d); 62.64 (t); 32.68 (t); 31.91 (t); 29.75 (t); 29.32 (t); 29.26 (t); 27.25 (t); 23.63 (t); 22.71 (t); 14.13 (q).

Preparation of (±)-1-(3,3- and 5,5-dimethyl-1-cyclohexen-1-yl)-4-penten-1-ol

As described above from a mixture of (±)-1-(3,3- and 5,5-dimethyl-1-cyclohexen-1-yl)-4-penten-1-one (ca. 1:3.5) to give 9.99 g (99%) of a mixture of two isomers (ca. 1:3.5).

¹H-NMR (360 MHz, major isomer): δ 5.91-5.76 (m, 1H); 5.64-5.58 (m, 1H); 5.07-4.93 (m, 2H); 3.99 (t, J=6.5, 1H); 2.97-1.95 (m, 4H); 1.89-1.51 (m, 2H); 1.36-1.28 (m, 2H); 0.91 (s, 6H).
¹³C-NMR (90.6 MHz, major isomer): δ 138.67 (s); 138.52 (d); 121.82 (d); 114.66 (t); 76.00 (d); 37.32 (t); 33.90 (t); 30.07 (t); 28.79 (s); 28.41 (q); 27.92 (q); 22.90 (t).
¹³C-NMR (90.6 MHz, minor isomer): δ 137.26 (s); 133.69 (d); 121.82 (d); 114.66 (t); 76.04 (d); 37.44 (t); 33.95 (t); 31.54 (s); 30.17 (q); 29.79 (q); 23.48 (t); 19.75 (t).

Preparation of (E)- and (Z)-9-undecen-1-ol

As described above from (E)- and (Z)-9-undecenal (ca. 1:1) to give 10.02 g (99%) of a mixture of two isomers (ca. 1:1).
¹H-NMR (360 MHz): δ 5.49-5.32 (m, 2H); 3.63 (t, J=6.5, 2H); 2.09-1.91 (m, 2H); 1.67-1.50 (m, 4H); 1.44-1.23 (m, 11H).
¹³C-NMR (90.6 MHz, (E)-isomer): δ 131.65 (d); 124.59 (d); 63.05 (t); 32.81 (t); 32.61 (t); 29.57 (t); 29.44 (t); 29.24 (t); 29.14 (t); 25.76 (t); 17.94 (q).
¹³C-NMR (90.6 MHz, (Z)-isomer): δ 130.86 (d); 123.66 (d); 63.05 (t); 32.81 (t); 29.62 (t); 29.54 (t); 29.51 (t); 29.44 (t); 26.84 (t); 25.76 (t); 12.75 (q).

Preparation of (±)-[4- and 3-(4-methyl-3-pentenyl)-3-cyclohexen-1-yl]methanol

As described above with 5.00 g (26.0 mmol) of (±)-4- and 3-(4-methyl-3-pentenyl)-3-cyclohexene-1-carbaldehyde in 35 ml of ether and 0.49 g (12.9 mmol) of $LiAlH_4$ in 45 ml of ether for 1.5 h to give 5.01 g (99%) of a mixture of two isomers as a yellow oil (ca. 7:3).
¹H-NMR (360 MHz): δ 5.44-535 (m, 1H); 5.14-5.06 (m, 1H); 5.59-5.46 (m, 2H); 2.18-1.90 (m, 8H); 1.82-1.66 (m, 2H); 1.68 (s, 3H); 1.64 and 1.60 (s, 3H); 1.34-1.12 (m, 1H).
¹³C-NMR (90.6 MHz, major isomer): δ 137.79 (s); 131.37 (s); 124.37 (d); 119.48 (d); 67.81 (t); 37.72 (t); 36.38 (d); 28.24 (t); 27.82 (t); 26.49 (t); 25.70 (t, q); 17.69 (q).
¹³C-NMR (90.6 MHz, minor isomer): δ 136.59 (s); 131.37 (s); 124.37 (d); 120.70 (d); 67.91 (t); 37.90 (t); 36.86 (d); 31.40 (t); 26.49 (t); 25.70 (q); 25.25 (t); 24.72 (t); 17.69 (q).

Preparation of (±)-5-[4- and 5-(hydroxymethyl)-1-cyclohexen-1-yl]-2-methyl-2-pentanol As described above from (±)-3- and 4-(4-hydroxy-4-methylpentyl)-3-cyclohexene-1-carbaldehyde to give 10.33 g (99%) of a colorless oil as a mixture of two isomers (ca. 4:1).
¹H-NMR (360 MHz): δ 5.43-5.36 (m, 1H); 3.57-3.44 (m, 2H); 2.26-1.89 (m, 5H); 1.88-1.62 (m, 3H); 1.52-1.37 (m, 4H); 1.34-1.14 (m, 1H); 1.21 (s, 6H).
¹³C-NMR (90.6 MHz, major isomer): δ 137.67 (s), 119.76 (d); 71.03 (s); 67.59 (t); 43.54 (t); 38.04 (t); 36.33 (d); 29.17 (q); 28.24 (t); 27.64 (t); 25.67 (t); 22.42 (t).
¹³C-NMR (90.6 MHz, minor isomer): δ 136.49 (s); 120.94 (s); 71.03 (s); 65.85 (s); 43.44 (t); 38.19 (t); 36.72 (d); 31.09 (t); 29.21 (q); 25.24 (t); 24.62 (t); 22.34 (t).

Preparation of (±)-1-(3,5,5,6,8,8-hexamethyl-5,6,7,8-tetrahydro-2-naphthalenyl)-ethanol A solution of (±)-1-(3,5,5,6,8,8-hexamethyl-5,6,7,8-tetrahydro-2-naphthalenyl)-1-ethanone (10.00 g, 38.7 mmol) in ether (65 ml) was added dropwise during 1 h to a suspension of $LiAlH_4$ (1.48 g, 39.0 mmol) in ether (70 ml) at 0° C. The reaction mixture was left warming up to room temperature and then heated to reflux for 1 day. After cooling to 0° C. more $LiAlH_4$ (0.76 g, 19.5 mmol) was added. After refluxing for another 3 days, the mixture was cooled to 0° C. and water was added dropwise. Extraction of the organic phase with water, drying over $Na_2SO_4$ and concentrating gave 10.19 g (99%) of the product.
¹H-NMR (360 MHz): δ 7.43 (d, J=3.2, 1H); 7.10 (s, 1H); 5.10-5.01 (m, 1H); 2.30 (s, 3H); 1.93-1.75 (m, 1H); 1.63 (t, J=13.3, 1H); 1.46 (t, J=6.1, 3H); 1.36 (dt, J=13.5, 2.4, 1H); 1.31 (d, J=4.4, 3H); 1.30 (s, 3H); 1.26 and 1.25 (s, 3H); 1.06 and 1.04 (s, 3H); 0.98 (d, J=6.7, 3H).
¹³C-NMR (90.6 MHz): δ 144.89 (s); 142.74 and 142.67 (s); 140.92 and 140.85 (s); 131.45 (s); 128.85 and 128.79 (d); 122.49 and 122.39 (d); 67.02 (d); 43.78 (t); 37.40 (s); 34.60 and 34.53 (d); 34.22 (s); 32.47 and 32.37 (q); 32.10 and 32.07 (q); 28.70 and 28.46 (q); 24.99 and 24.93 (q); 23.84 and 23.74 (q); 18.70 and 16.83 (q).

Preparation of ((6S,7S)-3,5,5,6,7,8,8-heptamethyl-5,6,7,8-tetrahydronaphthalen-2-yl)methanol A solution of 10.00 g (38.7 mmol) of (6S,7S)-3,5,5,6,7,8,8-heptamethyl-5,6,7,8-tetrahydronaphthalene-2-carbaldehyde in ether (50 ml) and tetrahydrofuran (THF, 15 ml) was added dropwise during 45 min to a suspension of $LiAlH_4$ (1.48 g, 39.0 mmol) in ether (55 ml) at 0° C. The reaction mixture was left warming up to room temperature and then heated to reflux for 1.5 h. After cooling to room temperature, the remaining $LiAlH_4$ was quenched with water (2 ml) and NaOH (10%, 2 ml) and water (6 ml) was added. The formation of a white precipitate was observed which was filtered off. Ether was added and the organic phase washed with water, dried ($Na_2SO_4$) and concentrated to give 10.11 g (quant.) of the product.
¹H-NMR (360 MHz): δ 7.31 (s, 1H); 7.14 (s, 1H); 4.63 (s, 2H); 2.31 (s, 3H); 1.75 (br. s, 1H); 1.63-1.51 (m, 2H); 1.31 (s, 3H); 1.30 (s, 3H); 1.09 (s, 6H); 0.99-0.93 (m, 6H).
¹³C-NMR (90.6 MHz): δ 145.18 (s); 143.31 (s); 135.88 (s); 133.00 (s); 129.04 (d); 126.62 (d); 63.76 (t); 39.31 (d); 39.28 (d); 37.56 (s); 29.54 (q); 29.45 (q); 25.58 (q); 25.51 (q); 18.40 (q); 13.81 (q).

Preparation of 2-Phenylacetaldehyde Containing Reference Polyurea Microcapsules (Microcapsules Out of the Scope of the Present Invention, Prepared Only for Comparison Purposes)
In a beaker, 2-phenylacetaldehyde (17.50 g, 146 mmol) and polyisocyanate (Desmodur® N100, origin: Bayer AG, 1.17 g, 6.11 mmol) were mixed to give a yellow solution. This solution was added to a solution of poly(vinyl alcohol) PVOH 18-88 (origin: Aldrich, 0.5 g) in water (49.5 ml) and an emulsion was prepared by Ultra-Turrax stirring (S25N 18G) at 6500 rpm during 4 min. The droplet size was controlled by light microscopy. The emulsion was transferred into a 250 ml reactor and stirred at 350 rpm at room temperature. A solution of guanidine carbonate (0.39 g, 4.36 mmol) in water (1 ml) was added dropwise to the emulsion over 1 h. The reaction mixture was warmed up from room temperature to 70° C. over 1 h, and then stirred at 350 rpm at 70° C. for 2 h to give a white dispersion of microcapsules.

The stability of the microcapsule dispersion was verified according to a procedure described in WO 2011/161618. The mass loss of the dispersion as a function of time was measured by thermogravimetric analysis at 50° C. After the initial evaporation of water, a plateau is generally observed with stable microcapsules. On the other hand, if the mass continues decreasing, this indicates the presence of a porous shell and instable microcapsules. The mass loss of the microcapsules of 2-phenylacetaldehyde was not stable, thus suggesting that the microcapsules cannot efficiently retain the 2-phenylacetaldehyde in their core. In contrast, all microcapsules according to the present invention, as prepared in the following examples, were found to be stable as shown by the fact that a plateau was observed in the thermogravimetric analyses.

Example 1

Preparation of 2-Oxoacetate Derivatives According to Formula (I)

General Method for the Preparation of 2-Oxo-2-Phenylacetates

A solution of benzoylformic acid (1 eq.), 4-(dimethylamino)pyridine (DMAP, 0.1 eq.) and the alcohol corresponding to the aldehyde or ketone to be released (10.00 g, ca. 1.7 eq.) in dichloromethane (50-100 ml) was cooled on an ice-bath before a solution of N,N'-dicyclohexylcarbodiimide (DCC, ca. 1.2 eq.) in dichloromethane (40 ml) was added dropwise during 15-30 min. The reaction mixture was stirred for 10 min at 0° C., then at room temperature for 3-6 h. The precipitate formed in the reaction was filtered off and the filtrate taken up in ether, washed with water (3×), HCl (10%, 3×) and a saturated solution of NaHCO$_3$ (3×). The organic layer was dried (Na$_2$SO$_4$) and concentrated to give the crude reaction product.

Preparation of 2-phenylethyl 2-oxo-2-phenylacetate

As described above in the general method with 2-phenylethanol (5.00 g, 41.0 mmol). Column chromatography (SiO$_2$, heptane/ether 8:2 to 7:3) gave 5.52 g (95%) of a yellow oil.
$^1$H-NMR (360 MHz): δ 7.89-7.82 (m, 2H); 7.66-7.58 (m, 1H); 4.49-7.40 (m, 2H); 7.36-7.20 (m, 5H); 4.62 (t, J=7.1, 2H); 3.08 (t, J=6.9, 2H).
$^{13}$C-NMR (90.6 MHz): δ 186.28 (s); 163.72 (s); 136.96 (s); 134.87 (d); 132.32 (s); 130.02 (d); 129.01 (d); 128.85 (d); 128.68 (d); 126.86 (d); 66.40 (t); 34.93 (t).

Preparation of (Z)-3-hexenyl 2-oxo-2-phenylacetate

As described above in the general method with (Z)-3-hexen-1-ol (6.61 g, 50.0 mmol, 1.3 eq.) stirred at room temperature for 48 h. Column chromatography (SiO$_2$, heptane/ether 7:3) gave 8.04 g (93%) of a yellow oil.
$^1$H-NMR (360 MHz): δ 8.04-7.98 (m, 2H); 7.69-7.62 (m, 1H); 7.55-7.47 (m, 2H); 5.61-5.51 (m, 1H); 5.41-5.31 (m, 1H); 4.39 (t, J=6.9, 2H); 2.58-2.49 (m, 2H); 2.12-2.01 (m, 2H); 0.95 (t, J=7.5, 3H).
$^{13}$C-NMR (90.6 MHz): δ 186.36 (s); 163.87 (s); 135.39 (d); 134.90 (d); 132.49 (s); 130.07 (d); 128.89 (d); 122.87 (d); 65.63 (t); 26.64 (t); 20.66 (t); 14.15 (q).

Preparation of (±)-3-methyl-5-phenylpentyl 2-oxo-2-phenylacetate

As described above in the general method. Column chromatography (SiO$_2$, heptane/ether 4:1, then 3:2) gave 9.48 g (94%) of a yellow oil.
$^1$H-NMR (360 MHz): δ 8.02-7.96 (m, 2H); 7.68-7.61 (m, 1H); 7.54-7.46 (m, 2H); 7.29-7.22 (m, 2H); 7.20-7.12 (m, 3H); 4.50-4.36 (m, 2H); 2.72-2.53 (m, 2H); 1.95-1.82 (m, 1H); 1.75-1.57 (m, 3H); 1.57-1.44 (m, 1H); 1.01 (d, J=5.9, 3H).
$^{13}$C-NMR (90.6 MHz): δ 186.39 (s); 163.95 (s); 142.41 (s); 134.89 (d); 132.47 (s); 130.00 (d); 128.90 (d); 128.35 (d); 128.30 (d); 125.73 (d); 64.67 (t); 38.71 (t); 35.19 (t); 33.24 (t); 29.49 (d); 19.36 (q).

Preparation of (1'R)-2-methyl-4-(2',2',3'-trimethyl-3'-cyclopenten-1'-yl)-4-pentenyl 2-oxo-2-phenylacetate As described above in the general method. Column chromatography (SiO$_2$, heptane/ether 9:1, then 1:1) gave 9.35 g (97%) of a yellow oil as a mixture of diastereoisomers.
$^1$H-NMR (360 MHz): δ 8.03-7.97 (m, 2H); 7.69-7.61 (m, 1H); 7.55-746 (m, 2H); 5.29-5.23 (m, 1H); 4.94 (d, J=7.9, 2H); 4.36-4.21 (m, 1H); 2.59-2.46 (m, 1H); 2.40-2.12 (m, 4H); 2.10-1.89 (m, 1H); 1.58 (s, 3H); 1.10-1.02 (m, 1H); 1.05 (s, 3H); 0.97 (d, J=6.7, 3H); 0.74 (s, 3H).
$^{13}$C-NMR (90.6 MHz): δ 186.45 (s); 186.38 (s); 164.09 (s); 164.02 (s); 147.34 (s); 147.24 (s); 146.92 (s); 146.78 (s); 134.87 (d); 132.49 (s); 129.98 (d); 128.90 (d); 121.56 (d); 121.49 (d); 112.80 (t); 112.71 (t); 70.85 (t); 70.34 (t); 55.62 (d); 55.12 (d); 47.80 (s); 47.72 (s); 41.18 (t); 41.09 (t); 34.17 (t); 34.08 (t); 31.04 (d); 26.91 (q); 20.96 (q); 17.47 (q); 16.49 (q); 12.81 (q).

Preparation of (Z)-4-dodecenyl 2-oxo-2-phenylacetate

As described above in the general method with (Z)-4-dodecenol (10.41 g, 56.5 mmol). Column chromatography (SiO$_2$, heptane/ether 9:1) gave 9.86 g (93%) of a yellow oil.
$^1$H-NMR (360 MHz): δ 8.04-7.98 (m, 2H); 7.79-7.62 (m, 1H); 7.55-7.47 (m, 2H); 5.49-5.29 (m, 2H); 4.39 (t, J=6.7, 2H); 2.18 (q, J=7.3, 2H); 2.01 (q, J=6.9, 2H); 1.89-1.79 (m, 2H); 1.38-1.17 (m, 10H); 0.87 (t, J=6.7, 3H).
$^{13}$C-NMR (90.6 MHz): δ 186.38 (s); 163.95 (s); 134.89 (d); 132.51 (s); 131.67 (d); 130.02 (d); 128.90 (d); 127.56 (d); 65.73 (t); 31.86 (t); 29.67 (t); 29.27 (t); 29.22 (t); 28.43 (t); 27.25 (t); 23.41 (t); 22.67 (t); 14.12 (q).

Preparation of (Z)-3-nonenyl 2-oxo-2-phenylacetate

As described above in the general method with (Z)-3-nonenol (1.28 g, 9.0 mmol, 1.4 eq.) in dichloromethane (15 ml) and DCC in dichloromethane (7 ml) stirred at room temperature for 24 h. Column chromatography (SiO$_2$, heptane/ethyl acetate 9:1) gave 1.21 g (66%) of a slightly yellow oil.
$^1$H-NMR (400 MHz): δ 8.04-7.98 (m, 2H); 7.69-7.62 (m, 1H); 7.54-7.47 (m, 2H); 5.61-5.51 (m, 1H); 5.44-5.34 (m, 1H); 4.39 (t, J=6.9, 2H); 2.58-2.50 (m, 2H); 2.08-2.00 (m, 2H); 1.39-1.20 (m, 6H); 0.86 (t, J=6.9, 3H).
$^{13}$C-NMR (100.6 MHz): δ 186.34 (s); 163.87 (s); 134.88 (d); 133.85 (d); 132.49 (s); 130.06 (d); 128.87 (d); 123.38 (d); 65.62 (t); 31.45 (t); 29.19 (t); 27.32 (t); 26.74 (t); 22.53 (t); 14.02 (q).

Preparation of (2E,6Z)-2,6-nonadienyl 2-oxo-2-phenylacetate

As described above in the general method. Column chromatography (SiO$_2$, heptane/ether 9:1, then 1:1) gave 10.03 g (90%) of a yellow oil.
$^1$H-NMR (360 MHz): δ 8.04-7.97 (m, 2H); 7.69-7.62 (m, 1H); 7.55-7.47 (m, 2H); 5.98-5.86 (m, 1H); 5.76-5.64 (m, 1H); 5.47-5.26 (m, 2H); 4.82 (d, J=6.7, 2H); 2.21-2.09 (m, 4H); 2.08-1.97 (m, 2H); 0.95 (t, J=7.5, 3H).
$^{13}$C-NMR (90.6 MHz): δ 186.29 (s); 163.64 (s); 137.93 (d); 134.90 (d); 132.49 (s, d); 130.06 (d); 128.88 (d); 127.73 (d); 122.85 (d); 66.81 (t); 32.35 (t); 26.36 (t); 20.57 (t); 14.28 (q).

Preparation of (±)-2,6-dimethyl-5-heptenyl 2-oxo-2-phenylacetate

As described above in the general method stirred at room temperature for 1.5 h. Column chromatography (SiO$_2$, heptane/ether 4:1, then 1:1) gave 9.63 g (86%) of a yellow oil.
$^1$H-NMR (360 MHz): δ 8.03-7.97 (m, 2H); 7.69-7.63 (m, 1H); 7.55-7.48 (m, 2H); 5.13-5.05 (m, 1H); 4.29 (ABX, J=10.7, 5.9, 1H); 4.20 (ABX, J=10.7, 6.7, 1H); 2.12-1.90 (m, 3H); 168 (s, 3H); 1.60 (s, 3H); 1.55-1.42 (m, 1H); 1.32-1.18 (m, 1H); 1.01 (t, J=6.7, 3H).
$^{13}$C-NMR (90.6 MHz): δ 186.53 (s); 164.14 (s); 134.88 (d); 132.53 (s); 131.92 (s); 130.00 (d); 128.92 (d); 124.00 (d); 70.91 (t); 33.23 (t); 32.14 (d); 25.72 (q); 25.21 (t); 17.68 (q); 16.73 (q).

Preparation of (±)-1-(3,3- and 5,5-dimethyl-1-cyclohexen-1-yl)-4-pentenyl 2-oxo2-phenylacetate As described above in the general method. Column chromatography (SiO$_2$, heptane/ether 4:1, then 1:1) gave 7.69 g (79%) of a yellow oil as a mixture of two isomers (ca. 1:3.5).
$^1$H-NMR (360 MHz, major isomer): δ 8.01-7.93 (m, 2H); 7.69-7.61 (m, 1H); 7.54-7.46 (m, 2H); 5.89-5.75 (m, 2H); 5.45 (t, J=6.9, 1H); 5.10-4.94 (m, 2H); 2.20-2.00 (m, 4H); 2.00-1.70 (m, 2H); 1.38-1.30 (m, 2H); 0.93 (s, 3H); 0.91 (s, 3H).
$^{13}$C-NMR (90.6 MHz, major isomer): δ 186.73 (s); 163.60 (s); 137.24 (d); 134.80 (d); 133.55 (s); 132.53 (s); 129.95 (d); 128.85 (d); 126.10 (d); 115.49 (t); 80.44 (d); 37.34 (t); 34.90 (t); 31.41 (t); 29.64 (t); 28.82 (s); 28.76 (q); 27.37 (q); 22.97 (t).

Preparation of decyl 2-oxo-2-phenylacetate

As described above in the general method with decanol (32.50 g, 205.3 mmol) in dichloromethane (350 ml) and DCC in dichloromethane (150 ml) stirred at room temperature overnight. Kugelrohr distillation (to remove remaining decanol) and repetitive column chromatography (SiO$_2$, heptane/ethyl acetate 7:3) gave 23.41 g (67%) of a slightly yellow oil.
$^1$H-NMR (400 MHz): δ 8.03-7.98 (m, 2H); 7.69-7.63 (m, 1H); 7.54-7.48 (m, 2H); 4.39 (t, J=6.8, 2H); 1.82-1.73 (m, 2H); 1.47-1.19 (m, 14H); 0.88 (t, J=6.9, 3H).
$^{13}$C-NMR (100.6 MHz): δ 186.50 (s); 164.02 (s); 134.87 (d); 132.55 (s); 130.02 (d); 128.89 (d); 66.41 (t); 31.88 (t); 29.50 (t); 29.47 (t); 29.29 (t); 29.17 (t); 28.48 (t); 25.80 (t); 22.67 (t); 14.11 (q).

Preparation of (E)- and (Z)-9-undecenyl 2-oxo-2-phenylacetate

As described above in the general method. Column chromatography (SiO$_2$, heptane/ether 7:3) gave 7.26 g (70%) of a yellow oil as a mixture of isomers.
$^1$H-NMR (360 MHz): δ 8.05-7.98 (m, 2H); 7.69-7.62 (m, 1H); 7.56-7.47 (m, 2H); 5.49-5.32 (m, 2H); 4.39 (t, J=6.7, 2H); 2.08-1.91 (m, 2H); 1.83-1.56 (m, 3H); 1.50-1.19 (m, 12H).

$^{13}$C-NMR (90.6 MHz, (E)-isomer): δ 186.50 (s); 164.02 (s); 134.88 (d); 132.53 (s); 131.56 (d); 130.02 (d); 128.90 (d); 124.63 (d); 66.38 (t); 32.57 (t); 29.55 (t); 29.37 (t); 29.15 (t); 29.05 (t); 28.47 (t); 25.78 (t); 17.93 (q).
$^{13}$C-NMR (90.6 MHz, (Z)-isomer): δ 186.50 (s); 164.02 (s); 134.88 (d); 132.53 (s); 130.76 (d); 130.02 (d); 128.90 (d); 123.70 (d); 66.38 (t); 29.55 (t); 29.51 (t); 29.37 (t); 29.34 (t); 28.47 (t); 26.81 (t); 25.78 (t); 12.76 (q).

Preparation of 10-undecenyl 2-oxo-2-phenylacetate

As described above in the general method. Column chromatography (SiO$_2$, heptane/ether 7:3) gave 9.37 g (89%) of a yellow oil.
$^1$H-NMR (360 MHz): δ 8.01 (d, J=7.1, 2H); 7.66 (t, J=7.3, 1H); 7.51 (t, J=7.7, 2H); 5.88-5.74 (m, 1H); 5.03-4.89 (m, 2H); 4.39 (t, J=6.7, 2H); 2.09-1.98 (m, 2H); 1.84-1.72 (m, 2H); 1.47-1.24 (m, 12H).
$^{13}$C-NMR (90.6 MHz): δ 186.50 (s); 164.02 (s); 139.17 (d); 134.88 (d); 132.52 (s); 130.03 (d); 128.90 (d); 114.16 (t); 66.39 (t); 33.80 (t); 29.40 (t); 29.37 (t); 29.15 (t); 29.08 (t); 28.91 (t); 28.47 (t); 25.78 (t).

Preparation of (±)-3-(4-tert-butyl-1-cyclohexen-1-yl) propyl 2-oxo-2-phenylacetate As described above in the general method stirred at room temperature for 22 h. Column chromatography (SiO$_2$, heptane/ether 9:1) gave 8.15 g (83%) of a yellow oil.
$^1$H-NMR (360 MHz): δ 8.04-7.97 (m, 2H); 7.69-7.62 (m, 1H); 7.55-7.47 (m, 2H); 5.47-5.41 (m, 1H); 4.37 (t, J=6.7, 2H); 2.12-1.68 (m, 9H); 1.33-1.07 (m, 2H); 0.86 (s, 9H).
$^{13}$C-NMR (90.6 MHz): δ 186.46 (s); 164.00 (s); 135.80 (s); 134.89 (d); 132.49 (s); 130.02 (d); 128.89 (d); 122.27 (d); 66.03 (t); 44.11 (d); 33.48 (t); 32.18 (s); 29.62 (t); 27.23 (q); 26.79 (t); 26.37 (t); 24.21 (t).

Preparation of (±)-7-hydroxy-3,7-dimethyloctyl 2-oxo2-phenylacetate

As described above in the general method. Column chromatography (SiO$_2$, heptane/ether 1:1) gave 9.25 g (89%) of a yellow oil.
$^1$H-NMR (360 MHz): δ 8.03-7.98 (m, 2H); 7.70-7.63 (m, 1H); 7.55-7.48 (m, 2H); 4.50-4.37 (m, 2H); 1.89-1.77 (m, 1H); 1.69-1.53 (m, 2H); 1.50-1.17 (m, 7H); 1.21 (s, 6H); 0.96 (d, J=6.3, 3H).
$^{13}$C-NMR (90.6 MHz): δ 186.46 (s); 163.99 (s); 134.92 (d); 132.46 (s); 130.01 (d); 128.91 (d); 70.93 (s); 64.80 (t); 44.02 (t); 37.27 (t); 35.27 (t); 29.75 (d); 29.31 (q); 29.21 (q); 21.56 (t); 19.44 (q).

Preparation of (±)-4-phenylbutan-2-yl 2-oxo-2-phenylacetate

As described above in the general method. Column chromatography (SiO$_2$, heptane/ether 4:1) gave 9.14 g (81%) of a yellow oil.
$^1$H-NMR (360 MHz): δ 8.04-7.97 (m, 2H); 7.70-7.62 (m, 1H); 7.56-7.48 (m, 2H); 7.32-7.25 (m, 2H); 7.23-7.15 (m, 3H); 5.29-5.18 (m, 1H); 2.82-2.63 (m, 2H); 2.17-2.04 (m, 1H); 2.00-1.88 (m, 1H); 1.43 (d, J=7.1, 3H).
$^{13}$C-NMR (90.6 MHz): δ 186.64 (s); 163.76 (s); 140.95 (s); 134.86 (d); 132.50 (s); 129.96 (d); 128.93 (s); 128.52 (d); 128.35 (d); 126.12 (d); 73.34 (d); 37.41 (t); 31.63 (t); 19.94 (q).

Preparation of (±)-[4- and 3-(4-methyl-3-pentenyl)-3-cyclohexen-1-yl]methyl 2-oxo-2-phenylacetate As described above with (±)-[4- and 3-(4-methyl-3-pentenyl)-3-cyclohexen-1-yl]methanol (4.40 g, 22.7 mmol, ca. 7:3) in dichloromethane (30 ml) and stirred at room temperature for 2 h. Column chromatography (SiO$_2$, heptane/ether 4:1) gave 4.02 g (94%) of the product as a mixture of isomers (ca. 7:3).

$^1$H-NMR (360 MHz): δ 8.04-7.97 (m, 2H); 7.70-7.62 (m, 1H); 7.56-7.47 (m, 2H); 5.45-5.35 (m, 1H); 5.09 (t, J=6.9, 1H); 4.33-4.27 (m, 2H); 2.24-1.91 (m, 8H); 1.91-1.74 (m, 2H); 1.68 (s, 3H); 1.60 (s, 3H); 1.46-1.20 (m, 1H).

$^{13}$C-NMR (90.6 MHz, major isomer): δ 186.48 (s); 164.08 (s); 137.75 (s); 134.90 (d); 131.47 (s); 130.00 (d); 128.92 (d); 124.22 (d); 118.83 (d); 70.29 (t); 37.61 (t); 32.96 (d); 31.27 (t); 28.16 (t); 26.40 (t); 25.71 (q); 25.60 (t); 17.69 (q).

$^{13}$C-NMR (90.6 MHz, minor isomer): δ 186.48 (s); 164.08 (s); 135.91 (s); 134.90 (d); 132.51 (s); 130.00 (d); 128.92 (d); 124.17 (d); 120.64 (d); 70.32 (t); 37.72 (t); 33.45 (d); 27.43 (t); 26.40 (t); 25.71 (q); 25.14 (t); 24.30 (t); 17.69 (q).

Preparation of (±)-[4- and 3-(4-hydroxy-4-methylpentyl)-3-cyclohexen-1-yl]methyl 2-oxo-2-phenylacetate As described above in the general method with (±)-5-[4- and 5-(hydroxymethyl)-1-cyclohexen-1-yl]-2-methyl-2-pentanol (9.00 g, 42.2 mmol, ca. 4:1) in dichloromethane (55 ml) to give 11.51 g (quant.) of a mixture of two isomers (ca. 4:1), containing small amounts of unreacted alcohol.

$^{13}$C-NMR (90.6 MHz, major isomer): δ 186.49 (s); 164.08 (s); 137.68 (s); 132.45 (s); 129.99 (d); 128.93 (d); 119.03 (d); 70.96 (s); 70.25 (t); 43.49 (t); 37.93 (t); 32.96 (d); 29.21 (q); 28.11 (t); 27.26 (t); 25.55 (t); 22.35 (t).

$^{13}$C-NMR (90.6 MHz, minor isomer): δ 186.49 (s); 164.08 (s); 135.83 (s); 134.93 (d); 132.45 (s); 129.99 (d); 128.93 (d); 120.82 (d); 70.99 (s); 70.29 (t); 43.53 (t); 38.91 (t); 33.40 (d); 31.09 (t); 29.25 (q); 25.12 (t); 24.25 (t); 22.38 (t).

Preparation of 3-(3,3- and 1,1-dimethyl-2,3-dihydro-1H-inden-5-yl)propyl 2-oxo-2-phenylacetate As described above in the general method with 3-(3,3- and 1,1-dimethyl-2,3-dihydro-1H-inden-5-yl)propanol (6.00 g, 29.0 mmol, ca. 3:2) in dichloromethane (36 ml) stirred at room temperature for 20 h. Column chromatography (SiO$_2$, heptane/ether 9:1) gave 4.72 g (88%) of a slightly yellow oil as a mixture of regioisomers (ca. 3:2).

$^1$H-NMR (360 MHz): δ 8.01 (dd, J=7.5, 1.2, 2H); 7.66 (dt, J=7.5, 1.2, 1H); 7.52 (t, J=7.9, 2H); 7.14-6.94 (m, 3H); 4.41 (t, J=6.5, 2H); 2.89-2.80 (m, 2H); 2.73 (q, J=7.7, 2H); 2.16-2.05 (m, 2H); 1.91 (t, J=7.1, 2H); 1.24 (s, 6H).

$^{13}$C-NMR (90.6 MHz, major isomer): δ 186.42 (s); 163.97 (s); 153.00 (s); 140.70 (s); 138.54 (s); 134.93 (d); 132.48 (s); 130.03 (d); 128.92 (d); 126.36 (d); 124.45 (d); 121.96 (d); 65.66 (t); 43.86 (s); 41.58 (t); 31.96 (t); 30.31 (t); 29.66 (t); 28.58 (q).

$^{13}$C-NMR (90.6 MHz, major isomer): δ 186.42 (s); 163.97 (s); 150.57 (s); 143.19 (s); 138.76 (s); 134.93 (d); 132.48 (s); 130.03 (d); 128.92 (d); 126.53 (d); 124.52 (d); 122.02 (d); 65.66 (t); 43.62 (s); 41.52 (t); 31.76 (t); 30.19 (t); 29.97 (t); 28.64 (q).

Preparation of (±)-1-(3,5,5,6,8,8-hexamethyl-5,6,7,8-tetrahydro-2-naphthalenyl)ethyl 2-oxo-2-phenylacetate As described above in the general method with (±)-1-(3,5,5,6,8,8-hexamethyl-5,6,7,8-tetrahydro-2-naphthalenyl)ethanol (9.55 g, 36.7 mmol) in dichloromethane (50 ml) stirred at room temperature for 18 h. Repetitive column chromatography (SiO$_2$, heptane/ether 4:1 and 95:5) gave 5.68 g (68%) of a colourless oil.

$^1$H-NMR (360 MHz): δ 7.96-7.89 (m, 2H); 7.66-7.58 (m, 1H); 7.46 (t, J=7.7, 2H); 7.35 (s, 1H); 7.14 (s, 1H); 6.32 (q, J=6.5, 1H); 2.39 (s, 3H); 1.92-1.79 (m, 1H); 1.72-1.56 (m, 4H); 1.40-1.17 (m, 10H); 1.06 (d, J=2.8, 3H); 0.98 (d, J=6.7, 3H).

$^{13}$C-NMR (90.6 MHz): δ 186.60 (s); 163.48 (s); 145.97 (s); 142.87 (s); 135.63 (s); 134.79 (d); 132.50 (s); 131.92 (s); 131.87 (s); 129.99 (d); 128.97 (d); 128.85 (d); 123.49 (d); 123.39 (d); 72.14 (d); 43.67 (t); 37.50 (s); 34.53 (d); 34.17 (s); 32.43 (q); 32.14 (q); 32.03 (q); 28.53 (q); 24.99 (q); 24.92 (q); 21.34 (q); 18.86 (q); 16.82 (q).

Preparation of ((6S,7S)-3,5,5,6,7,8,8-heptamethyl-5,6,7,8-tetrahydronaphthalen-2-yl)methyl 2-oxo-2-phenylacetate As described above in the general method with ((6S,7S)-3,5,5,6,7,8,8-heptamethyl-5,6,7,8-tetrahydronaphthalen-2-yl)methanol (10.15 g, 39.0 mmol) and DCC in dichloromethane (20 ml) added during 45 min and stirred at room temperature for 75 h. Column chromatography (SiO$_2$, heptane/ether 4:1) gave 8.09 g (91%) of the product.

$^1$H-NMR (360 MHz): δ 7.99-7.93 (m, 2H); 7.66-7.59 (m, 1H); 7.51-7.43 (m, 2H); 7.37 (s, 1H); 7.18 (s, 1H); 5.40 (s, 2H); 2.37 (s, 3H); 1.64-1.51 (m, 2H); 1.30 (s, 6H); 1.08 (s, 6H); 0.96 (d, J=6.3, 6H).

$^{13}$C-NMR (90.6 MHz): δ 186.29 (s); 163.92 (s); 146.70 (s); 143.56 (s); 134.85 (d); 133.98 (s); 132.49 (s); 129.97 (d); 129.65 (s); 129.24 (d); 129.01 (d); 128.85 (d); 66.57 (t); 39.20 (d); 37.68 (s); 37.51 (s); 29.50 (q); 29.38 (q); 25.58 (q); 25.46 (q); 18.68 (q); 13.80 (q).

Preparation of (±)-3,5,6,6-tetramethyl-4-methyleneheptan-2-yl 2-oxo-2-phenylacetate As described above in the general method with (±)-3,5,6,6-tetramethyl-4-methyleneheptan-2-ol (6.16 g, 33.4 mmol, major isomer of several double bond isomers) in dichloromethane (70 ml). Column chromatography (SiO$_2$, heptane/ether 9:1) gave 4.69 g (80%) of a yellow oil as a mixture of several isomers.

$^1$H-NMR (360 MHz): δ 8.03-7.93 (m, 2H); 7.69-7.60 (m, 1H); 7.55-7.45 (m, 2H); 5.32-5.19 (m, 1H); 5.04-4.87 (m, 2H); 2.63-2.52 (m, 1H); 2.09 (q, J=7.3, 1H); 1.29 (d, J=6.3, 3H); 1.09 (d, J=7.1, 3H); 0.99 (d, J=7.1, 3H); 0.89 (s, 9H).

$^{13}$C-NMR (90.6 MHz, major isomer): δ 186.56 (s); 163.66 (s); 154.48 (s); 134.79 (d); 132.59 (s); 129.98 (d); 128.88 (d); 111.21 (t); 76.08 (d); 49.37 (d); 46.05 (d); 34.23 (s); 27.66 (q); 16.66 (q); 14.50 (q); 12.49 (q).

Preparation of (Z)-3,7-dimethyl-2,6-octadienyl 2-oxo-2-phenylacetate

As described above in the general method, with the DCC being added during 50 min Column chromatography (SiO$_2$, heptane/ether 8:2) gave 9.55 g (93%) of a slightly yellow oil.

$^1$H-NMR (360 MHz: 8.8.03-7.97 (m, 2H); 7.69-7.61 (m, 1H); 7.54-7.47 (m, 2H); 5.48 (dt, J=7.1, 1.1, 1H); 5.14-5.02 (m, 1H); 4.88 (dd, J=7.3, 1.0, 2H); 2.23-2.15 (m, 2H); 2.15-2.06 (m, 2H); 1.80 (s, 3H); 1.67 (s, 3H); 1.60 (s, 3H).

¹³C-NMR (90.6 MHz): δ 186.42 (s); 163.89 (s); 144.50 (s); 134.84 (d); 132.55 (s); 132.43 (s); 130.04 (d); 128.86 (d); 123.38 (d); 117.92 (d); 62.72 (t); 32.26 (t); 26.59 (t); 25.68 (q); 23.55 (q); 17.67 (q).

Preparation of (E)-3,7-dimethyl-2,6-octadienyl 2-oxo-2-phenylacetate

A solution of ethyl 2-oxo-2-phenylacetate (17.6 g, 99 mmol), (E)-3,7-dimethyl-2,6-octadienol (18.5 g, 120 mmol) and NaOCH$_3$ (30% in methanol, 1.5 ml) in cyclohexane (170 ml) was heated under reflux for 72 h. After cooling to room temperature the reaction mixture was taken up in ether, washed with water (pH≈7), dried (Na$_2$SO$_4$), filtered and concentrated. Column chromatography (SiO$_2$, heptane/ether 8:2) afforded 14.5 g (52%) of a slightly yellow oil.

¹H-NMR (360 MHz): δ 8.04-7.97 (m, 2H); 7.69-7.62 (m, 1H); 7.55-7.46 (m, 2H); 5.52-5.54 (m, 1H); 5.13-5.04 (m, 1H); 4.91 (d, J=7.2, 2H); 2.20-2.03 (m, 4H); 1.78 (s, 3H); 1.67 (s, 3H); 1.60 (s, 3H).

¹³C-NMR (90.6 MHz): δ 186.46 (s); 163.90 (s); 144.40 (s); 134.85 (d); 132.58 (s); 132.03 (s); 130.04 (d); 128.87 (d); 123.55 (d); 117.07 (d); 63.00 (t); 39.56 (t); 26.24 (t); 25.68 (q); 17.70 (q); 16.63 (q).

Preparation of (E)-3,7-dimethyl-2,6-octadienyl 2-oxopropanoate

A solution of 2-oxopropanoic acid (3.40 g, 38.6 mmol), DMAP (0.48 g, 3.9 mmol) and (E)-3,7-dimethyl-2,6-octadienol (10.00 g, 64.8 mmol) in dichloromethane (90 ml) was cooled on an ice-bath before a solution of DCC (9.18 g, 44.5 mmol) in dichloromethane (45 ml) was added during 30 min. The reaction mixture was stirred for 10 min at 0° C., then at room temperature for ca. 5 h. The precipitate formed in the reaction was filtered off and the filtrate taken up in ether, washed with water (3×), HCl (10%, 3×), a saturated solution of NaHCO3 (3×) and water. The organic layer was dried (Na$_2$SO$_4$) and concentrated. Column chromatography (SiO$_2$, heptane/ether 4:1) gave 4.68 g (53%) of a slightly yellow oil.

¹H-NMR (360 MHz): δ 5.44-5.36 (m, 1H); 5.12-5.03 (m, 1H); 4.77 (d, J=7.1, 2H); 2.47 (s, 3H); 2.16-2.00 (m, 4H); 1.74 (s, 3H); 1.68 (s, 3H); 1.60 (s, 3H).

¹³C-NMR (90.6 MHz): δ 192.10 (s); 160.83 (s); 144.13 (s); 131.98 (s); 123.56 (d); 116.96 (d); 63.24 (t); 39.54 (t); 26.75 (q); 26.19 (t); 25.68 (q); 17.70 (q); 16.57 (q).

Preparation of (±)-(2,4-dimethyl-3-cyclohexen-1-yl) methyl 2-cyclohexyl-2-oxoacetate Oxalyl chloride (10 ml, 116 mmol) was added dropwise to a stirred solution of (±)-(2,4-dimethylcyclohex-3-en-1-yl) methanol (32.48 g, 233 mmol, cis/trans ca. 4:1) in pyridine (270 ml) at 0° C. over a period of 15 min. The solution was allowed to warm up to room temperature and, after 21 h, was poured onto cold water, extracted with diethyl ether (2×), H$_2$SO$_4$ (10%) (2×), NaHCO$_3$ (sat.) and NaCl (sat.). The organic layer was dried (Na$_2$SO$_4$) and concentrated. Column chromatography (SiO$_2$, heptane/ether 8:2) gave 32.85 g (85%) of (±)-bis[(2,4-dimethyl-3-cyclohexen-1-yl)methyl] oxalate as a slightly yellow oil (mixture of cis/trans-isomers ca. 4:1).

¹H-NMR (360 MHz, major isomer): δ 5.36-5.28 (m, 1H); 4.21 (dd, J=7.5, 2.0; 2H); 2.42-2.29 (m, 1H); 2.17-2.05 (m, 1H); 2.05-1.80 (m, 2H); 1.68-1.38 (m, 2H); 1.64 (s, 3H); 0.88 (d, J=7.1, 3H).

¹H-NMR (360 MHz, minor isomer): δ 5.20-5.15 (m, 1H); 4.39-4.14 (m, 2H); 2.42-2.29 (m, 1H); 2.17-2.05 (m, 1H); 2.05-1.80 (m, 2H); 1.68-1.38 (m, 2H); 1.64 (s, 3H); 1.02 (d, J=6.73H).

¹³C-NMR (90.6 MHz, major isomer): δ 158.17 (s); 133.05 (s); 126.48 (d); 68.62 (t); 35.74 (d); 30.57 (d); 29.15 (t); 23.47 (q); 21.21 (t); 15.67 (q).

¹³C-NMR (90.6 MHz, minor isomer): δ 158.17 (s); 133.05 (s); 126.39 (d); 69.62 (t); 39.55 (d); 32.03 (d); 28.70 (t); 24.67 (t); 20.57 (q); 15.67 (q).

A Grignard reagent prepared from freshly distilled 1-bromocyclohexane (11.7 g, 71.7 mmol) and magnesium (1.9 g, 78.2 mmol) in THF (72 ml) was added dropwise to a stirred solution of (±)-bis[(2,4-dimethyl-3-cyclohexen-1-yl)methyl] oxalate (26.4 g, 78.9 mmol) in THF (180 ml) at −78° C. The mixture was slowly warmed to −10° C., quenched with a saturated solution of NH$_4$Cl (100 ml). The formation of a white precipitate was observed. The reaction mixture was extracted with ether (2×) and water (3×) and the organic phase dried over Na$_2$SO$_4$. Column chromatography (SiO$_2$, heptane/ether 8:2) gave 21.4 g of crude product still containing bis[(2,4-dimethyl-3-cyclohexen-1-yl)methyl]oxalate. MPLC of 0.5 g of the crude mixture on a Lobar® column (SiO$_2$ Merck Si60-C, heptane/ether 9:1) finally afforded 0.22 g of the pure product as a slightly yellow oil (mixture of cis/trans-isomers ca. 4:1).

¹H-NMR (360 MHz,): δ 5.35-5.29 (m, 1H, major isomer); 5.21-5.15 (m, 1H, minor isomer); 4.35-4.12 (m, 2H, minor isomer); 4.18 (dd, J=7.7, 2.9, 2 H, major isomer); 3.06-2.93 (m, 1H); 2.42-2.28 (m, 1H); 2.16-2.04 (m, 1H); 2.04-1.63 (m, 10H); 1.64 (s, 3H); 1.63-1.42 (m, 2H); 1.42-1.14 (m, 5H); 1.02 (d, J=6.7, 3 H, minor isomer); 0.88 (d, J=6.7, 3 H, major isomer).

¹³C-NMR (90.6 MHz, major isomer): δ 197.65 (s); 162.34 (s); 133.08 (s); 126.51 (d); 67.83 (t); 46.44 (d); 35.85 (d); 30.60 (d); 29.22 (t); 27.42 (t); 25.73 (t); 25.29 (t); 23.48 (q); 21.27 (t); 15.67 (q).

¹³C-NMR (90.6 MHz, minor isomer): δ 197.65 (s); 162.34 (s); 133.08 (s); 126.43 (d); 68.75 (t); 46.44 (d); 39.66 (d); 32.05 (d); 28.75 (t); 27.42 (t); 25.73 (t); 25.29 (t); 24.79 (t); 20.57 (q); 15.67 (q).

Preparation of (1R,2S,5R)-2-isopropyl-5-methylcyclohexyl 2-oxo-2-phenylacetate

Oxalyl chloride (6.11 g, 48.1 mmol) was added dropwise to a stirred solution of (−)-menthol (15.00 g, 96.0 mmol) in pyridine (124 ml) at 0° C. over a period of 15 min. The solution was allowed to warm up to room temperature and, after 24 h, was poured onto H$_2$SO$_4$ (50%, 200 ml) and ice. Ether was added (200 ml) and the extracted organic phase treated again with H$_2$SO$_4$ (50%, 200 ml), washed with a saturated solution of NaCl and a saturated solution of NaHCO$_3$ (2×). The organic layer was dried (Na$_2$SO$_4$) and concentrated. Column chromatography (SiO$_2$, heptane/ether 9:1) gave 16.02 g (91%) of bis((1R,2S,5R)-2-isopropyl-5-methylcyclohexyl) oxalate as a colorless oil.

¹H-NMR (400 MHz): δ 4.82 (td, J=10.9, 4.6, 2H); 2.11-2.03 (m, 2H); 1.94-1.84 (m, 2H); 1.75-1.66 (m, 4H); 1.58-1.45 (m, 4H); 1.18-1.02 (m, 4H); 0.97-0.84 (m, 2H); 0.93 (d, J=6.7, 6H); 0.91 (d, J=6.7, 6H); 0.79 (d, J=6.7, 6H).

¹³C-NMR (100.6 MHz): δ 158.20 (s); 77.54 (d); 46.42 (d); 40.28 (t); 34.06 (t); 31.44 (d); 26.41 (d); 23.66 (t); 21.94 (q); 20.56 (q); 16.48 (q).

A Grignard reagent prepared from bromobenzene (2.36 g, 15.0 mmol) and magnesium (0.39 g, 16.0 mmol) in THF (25 ml) was added dropwise to a stirred solution of bis((1R,2S,5R)-2-isopropyl-5-methylcyclohexyl) oxalate (5.00 g, 13.7 mmol) in THF (25 ml) at −78° C. The mixture was slowly warmed to room temperature, quenched with a saturated solution of NH$_4$Cl (50 ml) and ice. The reaction mixture was extracted with ether (2×) and water (2×) and the organic phase dried (Na$_2$SO$_4$). Repetitive column chromatography (SiO$_2$, heptane/ether 9:1) gave 1.28 g (32%) of the pure product as a slightly yellow oil.

$^1$H-NMR (400 MHz): δ 8.01-7.96 (m, 2H); 7.69-7.62 (m, 1H); 7.55-7.48 (m, 2H); 5.01 (td, J=11.0, 4.6, 1H); 2.22-2.14 (m, 1H); 2.01-1.91 (m, 1H); 1.78-1.68 (m, 2H); 1.64-1.48 (m, 2H); 1.25-1.05 (m, 2H); 0.98-0.83 (m, 1H); 0.96 (d, J=6.7, 3H); 0.91 (d, J=7.2, 3H); 0.85 (d, J=6.7, 3H).

$^{13}$C-NMR (90.6 MHz): δ 186.80 (s); 163.91 (s); 134.78 (d); 132.61 (s); 129.91 (d); 128.91 (d); 76.98 (d); 46.86 (d); 40.66 (t); 34.09 (t); 31.56 (d); 26.20 (d); 23.39 (t); 21.97 (q); 20.67 (q); 16.18 (q).

Alternatively, this compound was also prepared similarly to the general method described above.

Preparation of (R)-3,7-dimethyl-6-octenyl 2-(4-methylcyclohexyl)-2-oxoacetate

A Grignard reagent prepared from 1-bromo-4-methylcyclohexane (20.0 g, 0.11 mol) and magnesium (2.9 g, 0.12 mol) in THF (110 ml) was added dropwise (during a period of 80 min) to a mechanically stirred solution of diethyl oxalate (16.0 g, 0.11 mol) in THF (250 ml) at −78° C. The mixture was left stirring for 2 h and then slowly warmed up to 0° C. A saturated solution of NH$_4$Cl (100 ml) was added and the formation of a white precipitate was observed. Extraction with diethyl ether (2×), washing with water, drying (Na$_2$SO$_4$) and concentrating afforded 22.6 g of the crude compound. Kugelrohr distillation of 10 g (100° C./2 mbar) gave 7.74 g (76%) of ethyl 2-(4-methylcyclohexyl)-2-oxoacetate as a slightly yellow oil (mixture of cis/trans isomers ca. 1:3).

$^1$H-NMR (360 MHz): δ 4.36 (q, J=7.1, 2H (minor isomer)); 4.32 (q, J=7.1, 2H (major isomer)); 3.19-3.08 (m, 1H (minor isomer)); 2.96 (tt, J=3.4, 12.1, 1H (major isomer)); 1.99-1.75 (m, 4H); 1.69-1.51 (m, 1H); 1.45-1.15 (m, 3H); 1.39 (t, J=7.1, 3H (minor isomer)); 1.37 (t, J=7.1, 3H (major isomer)); 1.10-0.83 (m, 4H).

$^{13}$C-NMR (90.6 MHz, major isomer): δ 197.71 (s); 161.90 (s); 62.20 (t); 46.26 (d); 34.08 (t); 32.03 (d); 27.59 (t); 22.42 (q); 14.05 (q).

$^{13}$C-NMR (90.6 MHz, minor isomer): δ 198.28 (s); 162.59 (s); 62.08 (t); 43.81 (d); 30.99 (t); 30.33 (d); 24.39 (t); 20.66 (q); 13.94 (q).

A solution of ethyl 2-(4-methylcyclohexyl)-2-oxoacetate (5.0 g, 25 mmol), of (R)-3,7-dimethyl-6-octenol (4.74 g, 30 mmol) and NaOCH$_3$ (0.5 ml, 30% in methanol) in cyclohexane (50 ml) was heated with a water separator under reflux for 2 days. After cooling to room temperature, ether was added and the organic phase washed with a saturated solution of NaCl, dried (Na$_2$SO$_4$), filtered and concentrated. Column chromatography (SiO$_2$, heptane/ether 7:3 and heptane/ether 95:5) gave 1.16 g (15%) of the pure product a colorless oil as a mixture of cis/trans isomers (ca. 1:3).

$^1$H-NMR (360 MHz): δ 5.13-5.04 (m, 1H); 4.36-4.22 (m, 2H); 3.17-3.05 (m, 1H (minor isomer)); 2.94 (tt, J=3.4, 12.1, 1H (major isomer)); 2.10-1.86 (m, 4H); 1.84-1.71 (m, 3H); 1.70-1.47 (m, 3H); 1.68 (s, 3H); 1.60 (s, 3H); 1.44-1.14 (m, 5H); 1.07-0.87 (m, 7H).

$^{13}$C-NMR (90.6 MHz, major isomer): δ 197.70 (s); 162.03 (s); 131.50 (s); 124.38 (d); 64.72 (t); 46.34 (d); 36.90 (t); 35.20 (t); 34.07 (t); 32.02 (d); 29.43 (d); 27.54 (t); 25.71 (q); 25.36 (t); 22.41 (q); 19.34 (q); 17.66 (q).

$^{13}$C-NMR (90.6 MHz, minor isomer): δ 198.29 (s); 162.77 (s); 131.50 (s); 124.38 (d); 64.58 (t); 43.84 (d); 36.90 (t); 35.20 (t); 30.98 (t); 30.36 (d); 29.43 (d); 25.71 (q); 25.36 (t); 24.38 (t); 20.69 (q); 19.34 (q); 17.66 (q).

Preparation of (E)-3,7-dimethyl-2,6-octadienyl 2-(4-methylcyclohexyl)-2-oxoacetate As described in the preceding Example with (E)-3,7-dimethyl-2,6-octadienol (4.62 g, 30 mmol). Column chromatography (SiO$_2$, heptane/ether 8:2 and heptane/ether 95:5) gave 1.97 g (26%) of the pure product (mixture of cis/trans isomers (ca. 1:5).

$^1$H-NMR (360 MHz): δ 5.45-5.36 (m, 1H); 5.13-5.03 (m, 1H); 4.80 (d, J=7.1, 2H (minor isomer)); 4.76 (d, J=7.5, 2H (major isomer)); 3.16-3.08 (m, 1H (minor isomer)); 2.95 (tt, J=3.4, 12.1, 1H (major isomer)); 2.18-2.00 (m, 4H); 1.98-1.87 (m, 2H); 1.84-1.50 (m, 3H); 1.74 (s, 3H); 1.68 (s, 3H); 1.60 (s, 3H); 1.48-1.16 (m, 3H); 1.07-0.82 (m, 1H); 0.90 (d, J=6.7, 3H).

$^{13}$C-NMR (90.6 MHz, major isomer): δ 197.77 (s); 161.93 (s); 143.97 (s); 131.97 (s), 123.58 (d), 117.13 (d); 62.92 (t); 46.35 (d); 39.54 (t); 34.09 (t); 32.03 (d); 27.57 (t); 26.22 (t); 25.68 (q); 22.43 (q); 17.69 (q); 16.58 (q).

Example 2

Preparation of Melamine-Formaldehyde Microcapsules According to the Invention

General Preparation Method

A 2-oxoacetate photolabile pro-fragrance of formula (I) was emulsified by Ultra-Turrax stirring with a solution of Urecoll® (Urecoll® SMV: etherified melamine formaldehyde resin, aqueous solution with a non-volatile content of approx. 78.8%, origin: BASF) and a colloidal stabilizer (a copolymer of acrylic acid and acrylamide (20% by weight, origin: Aldrich) in water to obtain a slurry. The slurry was a stable oil/water emulsion with resin in the interface. The mixture was introduced into the reactor and heated in a generally known manner to achieve polymerization and cross-linking of the resin, and thus provide a rigid polymeric shell surrounding the oil droplet. In order to obtain the same microcapsule size from all syntheses, the stirring speed of the Ultra-Turrax was adapted accordingly.

In this manner, a series of microcapsules according to the invention, designated by the letters A1 to K1, as described in Table I below, and all comprising as pro-fragrance (I) the (E)-3,7-dimethyl-2,6-octadienyl 2-oxo-2-phenylacetate obtained as described in Example 1, was prepared.

For the synthesis of the A1 to E1 microcapsules (amount of Urecoll®, see Table I below) the stirring speed was 24000 rpm, whereas for the synthesis of the F1 to K1 microcapsules (amount of Urecoll®, see Table below) a stirring speed of 12000 rpm was used.

For each synthesis, the microcapsules were characterized by their zeta potential, size distribution and residual solid percentage obtained by thermogravimetric analysis (TGA). The percentage of encapsulated pro-fragrance (I) varied from 43% to 48% by weight, relative to the weight of the dispersion, giving a percentage of (E)-3,7-dimethyl-2,6-octadienal to be released varying between 20.8 and 23.0%.

The measured zeta potentials were highly negative, indicating that the external surface of the microcapsules was negatively charged.

The amount of resin (Urecoll®) used with respect to the total weight of the dispersion was varied between 6.20 (in microcapsules "A1") and 0.35% by weight (in microcapsules "K1") as follows:

TABLE I

| Microcapsules | A1 | B1 | C1 | D1 | E1 | F1 | G1 | H1 | I1 | J1 | K1 |
|---|---|---|---|---|---|---|---|---|---|---|---|
| % Urecoll ® by weight of the dispersion | 6.20 | 5.60 | 5.00 | 4.40 | 3.80 | 3.20 | 2.60 | 2.00 | 1.35 | 0.70 | 0.35 |
| Mean size (μm) | 6 | 12 | 18 | 7 | 6 | 17 | 16 | 17 | 17 | 18 | 30 |

Apart from the variation in resin concentration, all other synthesis parameters were kept constant. Likewise, all microcapsules were prepared with comparable size to avoid the influence of parameters other than the variation in Urecoll® concentration on the shell-thickness.

Example 3

Preparation of Melamine-Formaldehyde Microcapsules According to the Invention

Following the method described in Example 2, in a similar manner, there was prepared a series of microcapsules according to the invention, designated by the letters A2 to J2, as described in Table II below, and all comprising as pro-fragrance (I) the 2-phenylethyl 2-oxo-2-phenylacetate prepared as described in Example 1.

The percentage of encapsulated pro-fragrance (I) varied from 43% to 46% by weight, relative to the weight of the dispersion, giving a percentage of 2-phenylacetaldehyde to be released varying between 18.7 and 20.1%.

The amount of resin (Urecoll®) used with respect to the total weight of the dispersion was varied between 6.20 (in microcapsules "A2") and 0.70% by weight (in microcapsules "J2") as follows:

TABLE II

| Microcapsules | A2 | F2 | I2 | J2 |
|---|---|---|---|---|
| % Urecoll ® by weight of the dispersion | 6.20 | 3.20 | 1.35 | 0.70 |
| Mean size (μm) | 10.5 | 10 | 15.6 | 18.5 |

Apart from the variation in resin concentration, all other synthesis parameters were kept constant. Likewise, all microcapsules were prepared with comparable size to avoid the influence of parameters other than the variation in Urecoll® concentration on the shell-thickness.

Example 4

Preparation of Melamine-Formaldehyde Microcapsules According to the Invention

Following the method described in Example 2, in a similar manner, there was prepared a series of microcapsules according to the invention, designated by the letters A3 to J3, as described in Table III below, and all comprising as pro-fragrance (I) the (Z)-3-hexenyl 2-oxo-2-phenylacetate prepared as described in Example 1.

The percentage of encapsulated pro-fragrance (I) varied from 43% to 46% by weight, relative to the weight of the dispersion giving a percentage of (Z)-3-hexenal to be released varying between 16.6 and 17.8%.

The amount of resin (Urecoll®) used with respect to the total weight of the dispersion was varied between 6.20 (in microcapsules "A3") and 0.70% by weight (in microcapsules "J3") as follows:

TABLE III

| Microcapsules | A3 | F3 | I3 | J3 |
|---|---|---|---|---|
| % Urecoll ® by weight of the dispersion | 6.20 | 3.20 | 1.35 | 0.70 |
| Mean size (μm) | 8 | 12 | 12 | 12 |

Apart from the variation in resin concentration, all other synthesis parameters were kept constant. Likewise, all microcapsules were prepared with comparable size to avoid the influence of parameters other than the variation in Urecoll® concentration on the shell-thickness.

Example 5

Dynamic Headspace Analysis of the Fragrance Release from Microcapsules According to the Invention, Incorporated in a Consumer Product (Fabric Softener)

Sample Preparation

Several microcapsules described in Examples 2 to 4 were tested in a fabric softener for their ability to release 3,7-dimethyl-2,6-octadienal (citral), 2-phenylacetaldehyde or (Z)-3-hexenal, using the general methods described hereinbelow.

A fabric softener with the following final composition was used:

| | |
|---|---|
| Stepantex ® VL90 A (origin: Stepan) | 16.5% by weight |
| Calcium chloride (10% aq. solution) | 0.6% by weight |
| Water | 82.9% by weight |

In a vial, a freshly prepared dispersion of microcapsules, corresponding to a total amount of 0.026 mmol of pro-fragrance (I), was added to the above mentioned fabric softener (1.8 g). In parallel, two freshly prepared fabric softener reference samples (1.8 g each) containing either 0.026 mmol of the pure fragrance ingredient to be released or 0.026 mmol of the corresponding non-encapsulated pro-fragrance of formula (I) from the prior art (WO 99/60990), were also prepared in two additional vials.

After homogenization, the samples were dispersed in a beaker with 600 ml of demineralized cold tap water. In each case, a standard cotton sheet (ca. 12×12 cm) was added to each beaker and agitated manually for 3 min, left standing for 2 min, then the cotton sheet was wrung out by hand, and weighed to obtain a constant quantity of residual water. The cotton sheets were line-dried for 24 h in the dark.

Exposure to Light and Dynamic Headspace Analysis Methods (No Rubbing)

The cotton sheets were then analyzed in a headspace sampling cell (ca. 160 ml of inner volume), thermostated at 25° C., and exposed to a constant air flow of ca. 200 ml/min. The air was filtered through activated charcoal and aspirated through a saturated solution of NaCl to give a constant humidity of ca. 75%. For the measurements, the cotton sheets with the microcapsules according to the present invention and the pro-fragrance of the prior art were put into a headspace sampling cell and exposed to a xenon lamp (Heraeus Suntest CPS at about 90000 lux), respectively, whereas the reference sheet with the corresponding fragrance raw material (which does not respond to light) was put into another headspace sampling cell and exposed to natural indoor daylight. The headspace systems were equilibrated for 15 min, and then the evaporated volatiles were adsorbed for 10 min on a clean Tenax® cartridge (0.10 g). The results obtained after exposure of the different samples to the xenon lamp are summarized in Table IV.

TABLE IV

| Samples | Headspace concentration (ng/l) |
|---|---|
| A1 | 149.1 |
| B1 | 120.9 |
| F1 | 147.5 |
| I1 | 250.3 |
| (E)-3,7-dimethyl-2,6-octadienyl 2-oxo-2-phenylacetate (WO 99/60990) | 212.0 |
| 3,7-dimethyl-2,6-octadienal | 16.0 |
| A2 | 59.8 |
| F2 | 113.7 |
| I2 | 275.5 |
| 2-phenylethyl 2-oxo-2-phenylacetate (WO 99/60990) | 62.4 |
| 2-phenylacetaldehyde | 0.6 |
| A3 | 134.0 |
| F3 | 166.4 |
| I3 | 57.3 |
| (Z)-3-hexenyl 2-oxo-2-phenylacetate (WO 99/60990) | 75.1 |
| (Z)-3-hexen-1-al | 13.4 |

Diffusive microcapsules, as defined above, were generally obtained with a concentration of resin at about 3.20% with respect to the dispersion, and with diameters between 10 and 12 microns for the release of 2-phenylacetaldehyde and (Z)-3-hexenal. With larger microcapsules and corresponding thicker shells, diffusive microcapsules were obtained with a concentration of resin at about 1.35% for the release 3,7-dimethyl-2,6-octadienal.

In all cases, the headspace concentrations measured for the pro-fragrance containing microcapsules were found to be superior to those of the reference sample with the corresponding fragrance raw material. Furthermore, we observed that an increasing amount of fragrance ingredient was released with a decreasing amount of Urecoll® used to prepare the microcapsules. This suggests that there exists an optimum amount of resin to be used for the preparation of diffusive microcapsules. This amount can depend on the structure of the pro-fragrance molecule. For example, microcapsules I1 (diffusive) prepared with 1.35% of Urecoll® and releasing 3,7-dimethyl-2,6-octadienal was found to be the best delivery system giving rise to the highest headspace concentrations, followed by the prior art non-encapsulated pro-fragrance and by microcapsules A1 (non-diffusive) and, in the some order of magnitude, by microcapsules F1 and B1 (both non-diffusive). In the case of 2-phenylacetaldehyde, the order was found to be I2 and F2 (both diffusive), then the non-encapsulated pro-fragrance of the prior art, followed by A2 (non-diffusive). The headspace concentrations of (Z)-3-hexenal indicated a relatively fast release. In this case, F3 (diffusive) was the best delivery system giving rise to the highest headspace concentrations, followed by the non-encapsulated pro-fragrance and microcapsules A3 and I3 (both non-diffusive).

In view of the expected unfavorable transparency of the microcapsule shell to visible light, we have surprisingly found that encapsulating pro-fragrance of formula (I) into microcapsules according to the present invention resulted in an efficient release of the fragrance aldehyde or ketone. In all the cases tested, at least one microcapsule was found to be diffusive and thus to perform even better than the non-encapsulated pro-fragrance of the prior art. Furthermore, this better performance was observed with microcapsules and the corresponding non-encapsulated pro-fragrance which were both freshly prepared in the application. Under these conditions, the premature solvolysis of the non-encapsulated pro-fragrance is not relevant and results in a higher performance of the pro-fragrance as compared to maturated samples.

Example 6

Preparation of polyurea microcapsules A4-I4, according to the invention, comprising as pro-fragrance 2-phenylethyl 2-oxo-2-phenylacetate to release 2-phenylacetaldehyde Synthesis of Microcapsules with Different Shell Thicknesses and Compositions General procedure: In a beaker, a polyisocyanate (Desmodur® N100, origin: Bayer AG, and/or Takenate® D-110N, origin: Mitsui Chemicals, Table V) and pyren-1-ylmethanaminium chloride were dissolved in 2-phenylethyl 2-oxo-2-phenylacetate (obtained as described above in Example 1). This organic phase was introduced into an aqueous solution of poly(vinyl alcohol) PVOH 18-88 (1 wt %, origin: Aldrich). An emulsion was prepared by Ultra-Turrax stirring (S25N 10G). The droplet size was controlled by light microscopy. The emulsion was then introduced at room temperature into a 250 ml reactor and stirred with an anchor at 350 rpm. A solution of guanidine carbonate and/or guanazole (Table V, origin: Alfa Aesar) in water was added dropwise to the emulsion for 1 h. The reaction mixture was warmed up from room temperature to 70° C. during 1 h, and then kept at 70° C. for 2 h to afford a white dispersion.

TABLE V

Composition of polyurea microcapsules of 2-phenylethyl 2-oxo-2-phenylacetate with different shell thicknesses.

| | Capsules | | | | | | | |
|---|---|---|---|---|---|---|---|---|
| Ingredient (wt %) | A4 | B4 | C4 | D4 | E4 | F4 | G4 | H4 |
| Desmodur ® N-100 | 1.66 | 0.82 | 2.54 | 2.67 | 0 | 1.76 | 1.76 | 0.84 |
| Takenate ® D-110N | 0 | 0 | 0 | 0 | 5.18 | 0 | 0 | 1.71 |

TABLE V-continued

Composition of polyurea microcapsules of 2-phenylethyl 2-oxo-2-phenylacetate with different shell thicknesses.

| Ingredient (wt %) | Capsules | | | | | | | |
|---|---|---|---|---|---|---|---|---|
| | A4 | B4 | C4 | D4 | E4 | F4 | G4 | H4 |
| 2-phenylethyl 2-oxo-2-phenylacetate | 24.62 | 24.54 | 25.06 | 39.99 | 38.78 | 26.10 | 26.11 | 25.11 |
| pyren-1-ylmethanaminium chloride | 0.01 | 0.01 | 0.01 | 0.02 | 0.01 | 0.01 | 0.01 | 0.01 |
| guanidine carbonate | 0.55 | 0.28 | 0.85 | 0.91 | 0.87 | 0.29 | 0.44 | 0.56 |
| guanazole | 0 | 0 | 0 | 0 | 0 | 0.32 | 0.16 | 0 |
| PVOH 8-88 | 0.70 | 0.72 | 0.69 | 0.54 | 0.53 | 0.69 | 0.69 | 0.69 |
| water | 72.46 | 73.63 | 70.85 | 55.87 | 54.63 | 70.83 | 70.83 | 71.08 |
| Total (wt %) | 100 | 100 | 100 | 100 | 100 | 100 | 100 | 100 |
| Equivalent resin (%) | 100 | 50 | 150 | 100 | 100 | 100 | 100 | 100 |

Note:

Microcapsules A4 and D4 have the same shell/oil ratio but a different oil/water ratio. This composition suggests that they have the same shell thicknesses as a function of their size and are thus expected to be comparable in their properties.

Preparation of polyurea microcapsules I4, according to the invention, comprising a model perfume and, as pro-fragrance, 2-phenylethyl 2-oxo-2-phenylacetate releasing 2-phenylacetaldehyde In a beaker, a polyisocyanate (Takenate® D-110N, 5.36 g, 14.03 mmol) and pyren-1-ylmethanaminium chloride (38.50 mg, 0.14 mmol) were dissolved in a model perfume (20.14 g, Table VI) and 2-phenylethyl 2-oxo-2-phenylacetate (20.00 g, 79.00 mmol) to give a solution. An emulsion of the organic phase in an aqueous solution of PVOH 18-88 (1 wt %, 54.90 g) was prepared by Ultra-Turrax stirring (S25N 10G) at 6500 rpm for 4 min and finally at 13500 rpm for 2 min. The droplet size was controlled by light microscopy. The emulsion was then introduced at room temperature into a 250 ml reactor and stirred at a speed of 350 rpm with an anchor. A solution of guanidine carbonate (0.90 g, 10.03 mmol) in water (2 ml) was added dropwise to the emulsion for 1 h. The reaction mixture was warmed up from room temperature to 70° C. during 1 h, and then kept at 70° C. for 2 h to afford a white dispersion.

TABLE VI

Composition of the model perfume.

| Ingredient | Weight (g) |
|---|---|
| Romascone ® (origin: Firmenich SA) | 20 |
| Verdox ® (origin: International Flavors and Fragrances) | 20 |
| 4-tert-Butyl-1-cyclohexylacetate (Dorisyl) | 20 |
| 3-(4-Isopropylphenyl)-2-methylpropanal | 20 |
| Salicynile ™ (origin: Firmenich SA) | 20 |

Influence of Shell Thickness and Shell Composition of Polyurea Microcapsules on Kinetic of Release
Measurement of Shell Thickness of Microcapsules A4, B4 and C4

The thickness and the diameter of the microcapsules were determined by AFM (on a Nanoscope IV, NS4-1, Digital Instruments). The three different microcapsule dispersions (30 mg) were diluted in acetone and deposited (5 μL) onto a mica sheet and air-dried at room temperature for 24 h. The single-shell thickness of the capsules was then estimated as the half-height of the flat region of a dried collapsed capsule. The shell thickness was plotted as a function of the capsule diameter for each sample (see FIG. 1).

Kinetics of Release as a Function of Shell Thickness (No Rubbing)

Each sample of microcapsules was centrifuged at 500 rpm and then at 2000 rpm to afford two populations, the first one centred at 6 microns, the second one centred at 20 microns. According to AFM measurements, capsules with a diameter of 6 microns should have a thin shell, whereas capsules at 20 microns should have thick shell.

Three samples of microcapsules A4, B4, and C4 prepared with 100%, 50% and 150% equivalents of resin, respectively, were treated. The diffusivity of the capsules was determined by headspace analysis. Dispersions of microcapsules were put onto glass slides and kept at room temperature in the dark for 24 h. One glass slide was then introduced into a headspace sampling cell (ca. 500 ml of inner volume), and exposed to a constant air flow of ca. 200 ml/min. The air was filtered through activated charcoal and aspirated through a saturated solution of NaCl to give a constant humidity of ca. 75%. The glass slides were exposed to xenon light (Heraeus Suntest CPS at about 45000 lux), respectively. The evaporated volatiles were adsorbed for 10 min onto a clean Tenax® cartridge (0.10 g) every 15 minutes. The results obtained after exposure of the different samples to the xenon lamp are summarized in Table VII.

TABLE VII

Headspace concentration of 2-phenylacetaldehyde obtained from 2-phenylethyl 2-oxo-2-phenylacetate (WO 99/60990) and a dispersion of microcapsules A4, B4, and C4 after exposure to a xenon lamp for 40 min.
Headspace concentration of 2-phenylacetaldehyde (ng/l) after 40 min at ca. 45000 lux

| 2-phenylethyl 2-oxo-2-phenylacetate | 2-Phenylacetaldehyde containing reference polyurea microcapsule | | Microcapsules A4 | | Microcapsules B4 | | Microcapsules C4 | |
|---|---|---|---|---|---|---|---|---|
| | | | | Mean diameter | | | | |
| (WO99/60990) | 6 µm | 20 µm | 6 µm | 20 µm | 6 µm | 20 µm | 6 µm | 20 µm |
| 4311 | 9 | 20 | 5759 | 3204 | 5474 | 3461 | 2570 | 3001 |

Small microcapsules A4 and B4 (with a diameter of about 6 microns) prepared with 100% and 50% equivalents of resin, respectively, were found to be diffusive, in contrast to microcapsules C4, prepared with 150% equivalent resin, which were non-diffusive. On the other hand, all microcapsules A4, B4 and C4 with a diameter of about 20 microns were found to be non-diffusive as a result of a thicker polyurea shell. Comparison of the headspace concentrations of 2-phenylacetaldehyde released from microcapsules A4, B4 and C4 containing the corresponding pro-fragrance of formula (I) with those measured for the 2-phenylacetaldehyde containing reference microcapsule (prepared as described above) showed that, after exposure to light, the former perform by several orders of magnitudes better than the latter. As mentioned above, the 2-phenylacetaldehyde containing reference microcapsule is unstable and not non-diffusive (according to the criteria defined above). It was shown that most of the encapsulated 2-phenylacetaldehyde evaporated during the first 24 h after being put onto the glass slides. Furthermore, the 2-phenylacetaldehyde containing reference microcapsule was found to be less efficient than free, non-encapsulated 2-phenylacetaldehyde, applied and analyzed under the same conditions and giving rise to a headspace concentration of 143 ng/l.

Kinetics of Release as a Function of Shell Composition

Headspace concentration of 2-phenylacetaldehyde were also measured as a function of the composition of the shell according to the procedure described above. Microcapsules E4 were prepared with an aromatic isocyanate (Takenate® D-110N) whereas microcapsules F4 were prepared with an equimolar mixture of two amino compounds (guanidine carbonate and guanazole). The results, obtained after exposure of the different samples to a xenon lamp, are summarized in Table VIII.

TABLE VIII

Headspace concentration of 2-phenylacetaldehyde obtained from 2-phenylethyl 2-oxo-2-phenylacetate (WO 99/60990) and a dispersion of microcapsules E4 and F4 after exposure to a xenon lamp for 40 min.
Headspace concentration of 2-phenylacetaldehyde (ng/l) after 40 min at ca. 45000 lux

| 2-phenylethyl 2-oxo-2-phenylacetate | Microcapsules E4 | | Microcapsules F4 | |
|---|---|---|---|---|
| | | Mean diameter | | |
| (WO 99/60990) | 6 µm | 20 µm | 6 µm | 20 µm |
| 4311 | 52 | 15 | 2763 | 123 |

Microcapsules E4, prepared with an aromatic isocyanate, were found to be non-diffusive (lower headspace concentrations of 2-phenylacetaldehyde were measured as compared to the non-encapsulated reference). The addition of guanazole significantly decreased the headspace concentration of 2-phenylacetaldehyde released from the pro-fragrance (I) in microcapsules F4, particularly with the diameter of the microcapsules increasing from 6 to 20 microns.

Such non diffusive microcapsule can be used to provide a burst effect after rubbing, which cannot be obtained with the pure ingredient encapsulated or with the non-encapsulated compound (I).

Example 7

Preparation of polyurea microcapsules E5, according to the invention, comprising as pro-fragrance (Z)-3-hexenyl 2-oxo-2-phenylacetate to release (Z)-3-hexenal Following the method described above for microcapsules E4 in Example 6, in a similar manner, microcapsules according to the invention comprising as pro-fragrance (Z)-3-hexenyl 2-oxo-2-phenylacetate (obtained as described above in Example 1) were prepared.

| Ingredient | Weight (g) | wt % |
|---|---|---|
| Takenate ® D-110N (polyisocyanate) | 5.44 | 5.27 |
| pyren-1-ylmethanaminium chloride | 0.04 | 0.04 |
| (Z)-3-hexenyl 2-oxo-2-phenylacetate | 40.01 | 38.74 |
| PVOH 18-88 | 0.55 | 0.53 |
| guanidine carbonate | 0.90 | 0.87 |
| water | 56.35 | 54.55 |
| Total | 103.29 | 100 |

Example 8

Preparation of polyurea microcapsules E6, according to the invention, comprising as pro-fragrance (E)-3,7-dimethyl-2,6-octadienyl 2-oxo-2-phenylacetate to release (E)-3,7-dimethyl-2,6-octadienal (citral)

Following the method described above for microcapsules E4 in Example 6, in a similar manner, microcapsules according to the invention comprising as pro-fragrance (E)-3,7-dimethyl-2,6-octadienyl 2-oxo-2-phenylacetate (obtained as described above in Example 1) were prepared.

| Ingredient | Weight (g) | wt % |
|---|---|---|
| Takenate ® D-110N (polyisocyanate) | 5.36 | 5.19 |
| pyren-1-ylmethanaminium chloride | 0.04 | 0.04 |
| (E)-3,7-dimethyl-2,6-octadienyl 2-oxo-2-phenylacetate | 40.00 | 38.76 |
| PVOH 18-88 | 0.55 | 0.53 |
| guanidine carbonate | 0.90 | 0.87 |
| water | 56.35 | 54.61 |
| Total | 103.20 | 100 |

Example 9

Preparation of polyurea microcapsules E7, according to the invention, comprising as pro-fragrance (±)-3-methyl-5-phenylpentyl 2-oxo-2-phenylacetate to release (±)-3-methyl-5-phenylpentanal (Phenexal®)

Following the method described above for microcapsules E4 in Example 6, in a similar manner, microcapsules according to the invention comprising as pro-fragrance (±)-3-methyl-5-phenylpentyl 2-oxo-2-phenylacetate (obtained as described above in Example 1) were prepared.

| Ingredient | Weight (g) | wt % |
|---|---|---|
| Takenate ® D-110N (polyisocyanate) | 5.35 | 5.19 |
| pyren-1-ylmethanaminium chloride | 0.04 | 0.04 |
| (±)-3-methyl-5-phenylpentyl 2-oxo-2-phenylacetate | 40.00 | 38.76 |
| PVOH 18-88 | 0.55 | 0.53 |
| guanidine carbonate | 0.90 | 0.87 |
| water | 56.35 | 54.61 |
| Total | 103.19 | 100 |

Example 10

Preparation of polyurea microcapsules E8, according to the invention, comprising as pro-fragrance (±)-3-(4-tert-butyl-1-cyclohexen-1-yl)propyl 2-oxo-2-phenylacetate to release (±)-3-(4-(tert-butyl-1-cyclohexen-1-yl)propanal (Mugoxal®)

Following the method described above for microcapsules E4 in Example 6, in a similar manner, microcapsules according to the invention comprising as pro-fragrance (±)-3-(4-tert-butyl-1-cyclohexen-1-yl)propyl 2-oxo-2-phenylacetate (obtained as described above in Example 1) were prepared.

| Ingredient | Weight (g) | wt % |
|---|---|---|
| Takenate ® D-110N (polyisocyanate) | 0.67 | 2.84 |
| pyren-1-ylmethanaminium chloride | 4.70 × 10⁻³ | 0.02 |
| (±)-3-(4-tert-butyl-1-cyclohexen-1-yl)propyl 2-oxo-2-phenylacetate | 5.00 | 21.21 |
| PVOH 18-88 | 0.17 | 0.72 |
| guanidine carbonate | 0.23 | 0.97 |
| water | 17.50 | 74.24 |
| Total | 23.57 | 100 |

Example 11

Preparation of polyurea microcapsules E9, according to the invention, comprising benzyl acetate and as pro-fragrance (1R,2S,5R)-2-isopropyl-5-methylcyclohexyl 2-oxo-2-phenylacetate to release (2S,5R)-2-isopropyl-5-methylcyclohexanone (menthone)

In a beaker, a polyisocyanate (Takenate® D-110N, 5.35 g, 14.01 mmol) and pyren-1-ylmethanaminium chloride (39.00 mg, 0.15 mmol) were dissolved in benzyl acetate (32 g, 213.00 mmol) and (1R,2S,5R)-2-isopropyl-5-methylcyclohexyl 2-oxo-2-phenylacetate (8.03 g, 27.80 mmol, prepared as described above in Example 1) to give a solution. An emulsion of the organic phase in an aqueous solution of PVOH 18-88 (1 wt %, 54.90 g) was prepared by Ultra-Turrax stirring (S25N 10G) at 6500 rpm for 4 min and finally at 13500 rpm for 2 min. The droplet size was controlled by light microscopy. The emulsion was then introduced at room temperature into a 250 ml reactor and stirred at a speed of 350 rpm with an anchor. A solution of guanidine carbonate (0.91 g, 10.10 mmol) in water (2 mL) was added dropwise to the emulsion for 1 h. The reaction mixture was warmed up from room temperature to 70° C. during 1 h, and then kept at 70° C. for 2 h to afford a white dispersion.

Example 12

Preparation of polyurea microcapsules E10, according to the invention, comprising as pro-fragrance decyl 2-oxo-2-phenylacetate to release 1-decanal Following the method described above for microcapsules E9 in Example 11, in a similar manner, microcapsules according to the invention comprising as pro-fragrance decyl 2-oxo-2-phenylacetate (obtained as described in Example 1) were prepared.

| Ingredient | Weight (g) | wt % |
|---|---|---|
| Takenate ® D-110N (polyisocyanate) | 2.34 | 3.03 |
| pyren-1-ylmethanaminium chloride | 0.02 | 0.03 |
| benzyl acetate | 6.00 | 7.77 |
| decyl 2-oxo-2-phenylacetate | 17.50 | 22.65 |
| PVOH 18-88 | 0.50 | 0.65 |
| guanidine carbonate | 0.40 | 0.52 |
| water | 50.50 | 65.35 |
| Total | 77.26 | 100 |

Example 13

Preparation of polyurea microcapsules E11, according to the invention, comprising as pro-fragrance (±)-2,6-dimethyl-5-heptenyl 2-oxo-2-phenylacetate to release (±)-2,6-dimethyl-5-heptenal (melonal)

Following the method described above for microcapsules E9 in Example 11, in a similar manner, microcapsules according to the invention comprising (±)-2,6-dimethyl-5-heptenyl 2-oxo-2-phenylacetate as pro-fragrance (obtained as described in Example 1) were prepared.

| Ingredient | Weight (g) | wt % |
|---|---|---|
| Takenate ® D-110N (polyisocyanate) | 0.94 | 1.27 |
| pyren-1-ylmethanaminium chloride | 7.20 × 10⁻³ | 0.01 |
| benzyl acetate | 4.00 | 5.40 |
| (±)-2,6-dimethyl-5-heptenyl 2-oxo-2-phenylacetate | 7.01 | 9.47 |
| PVOH 18-88 | 0.60 | 0.81 |
| guanidine carbonate | 0.16 | 0.22 |
| water | 61.30 | 82.82 |
| Total | 74.02 | 100 |

Example 14

Preparation of polyurea microcapsules E12 according to the invention comprising methyl 2-(3-oxo-2-pentylcyclopentyl)acetate and as pro-fragrance 3-(3, 3- and 1,1-dimethyl-2,3-dihydro-1H-inden-5-yl) propyl 2-oxo-2-phenylacetate to release 3-(3,3- and 1,1-dimethyl-2,3-dihydro-1H-inden-5-yl)propanal In a beaker, a polyisocyanate (Takenate® D-110N, 1.34 g, 3.50 mmol) and pyren-1-ylmethanaminium chloride (10.30 mg, 0.04 mmol) were dissolved in methyl 2-(3-oxo-2-pentyl-cyclopentyl)acetate (8.23 g, 36.40 mmol) and 3-(3,3- and 1,1-dimethyl-2,3-dihydro-1H-inden-5-yl)propyl 2-oxo-2-phenylacetate (2.01 g, 5.98 mmol) to give a solution. An emulsion of the organic phase in an aqueous solution of PVOH 18-88 (1 wt %, 57.00 g) was prepared by Ultra-Turrax stirring (S25N 10G) at 6500 rpm for 2 min and finally at 13500 rpm for 2 min. The droplet size was controlled by light microscopy. The emulsion was then introduced at room temperature into a 250 ml reactor and stirred at a speed of 350 rpm with an anchor. A solution of guanidine carbonate (0.45 g, 5.00 mmol) in water (1 ml) was added dropwise to the emulsion during 1 h. The reaction mixture was warmed up from room temperature to 70° C. during 1 h, and then kept at 70° C. for 2 h to afford a white dispersion.

| Ingredient | Weight (g) | wt % |
|---|---|---|
| Takenate ® D-110N (polyisocyanate) | 1.34 | 1.91 |
| pyren-1-ylmethanaminium chloride | 10.30 × 10⁻³ | 0.01 |
| methyl 2-(3-oxo-2-pentylcyclopentyl)acetate | 8.23 | 11.75 |
| 3-(3,3- and 1,1-dimethyl-2,3-dihydro-1H-inden-5-yl)propyl 2-oxo-2-phenylacetate | 2.01 | 2.87 |
| PVOH 18-88 | 0.57 | 0.81 |
| guanidine carbonate | 0.45 | 0.65 |
| water | 57.43 | 82.00 |
| Total | 70.04 | 100 |

Example 15

Preparation of polyurea microcapsules E13 according to the invention comprising methyl 2-(3-oxo-2-pentylcyclopentyl)acetate and as pro-fragrance (E)- and (Z)-9-undecenyl 2-oxo-2-phenylacetate to release (E)- and (Z)-9-undecenal (aldehyde Supra)

Following the method described above for microcapsules E12 in Example 14, in a similar manner, microcapsules according to the invention comprising (E)- and (Z)-9-undecenyl 2-oxo-2-phenylacetate as pro-fragrance (obtained as described in Example 1) were prepared.

| Ingredient | Weight (g) | wt % |
|---|---|---|
| Takenate ® D-110N (polyisocyanate) | 1.34 | 1.92 |
| pyren-1-ylmethanaminium chloride | 10.30 × 10⁻³ | 0.01 |
| methyl 2-(3-oxo-2-pentylcyclopentyl)acetate | 8.23 | 11.79 |
| (E)- and (Z)-9-undecenyl 2-oxo-2-phenylacetate | 1.78 | 2.55 |
| PVOH 18-88 | 0.57 | 0.82 |
| guanidine carbonate | 0.45 | 0.64 |
| water | 57.43 | 82.27 |
| Total | 69.81 | 100 |

Example 16

Preparation of formaldehyde-free melamine microcapsules A14 and B14, according to the invention, comprising as pro-fragrance 2-phenylethyl 2-oxo-2-phenylacetate to release 2-phenylacetaldehyde Preparation of Oligomeric Composition:
In a round bottom flask of 50 ml, oxalaldehyde (40% w/w in water, 2.11 g), 2,2-dimethoxyacetaldehyde (60% w/w in water, 1.69 g), 2-oxoacetic acid (50% w/w in water, 0.72 g), and 1,3,5-triazine-2,4,6-triamine (1.11 g) were added to demineralized water (1.90 g). The pH was adjusted to 9.0 with sodium hydroxide (30% w/w in water). The mixture was heated at 45° C. for 25 min to give a solution (pH=6.6). Then demineralized water (8.35 g) was added and the resin was stirred for 5 min.

Preparation of Microcapsules
A solution of the oligomeric composition was dissolved in a solution of Ambergum™ 1221 and introduced into a 200 ml reactor in the presence of guanazole (a $C_{1-4}$ diamino compound, 0.98 g) and demineralized water (32.5 g, pH=9.00-9.50). A solution of 2-phenylethyl 2-oxo-2-phenylacetate and a polyisocyanate was added and emulsified with Ultra-turrax at 21500-24000 rpm for 2 min. The pH was adjusted to 5.00-5.50 with formic acid (30% w/w in water). The reaction mixture was heated at 80° C. for 4 h, then cooled to room temperature (pH=5.50-6.00). The slurry of microcapsules was neutralized with a solution of sodium hydroxide (30 wt % in water).

| Capsules | A14 (100% shell) | B14 (83% shell) |
|---|---|---|
| Oligomeric composition (g) | 16.9 | 16.9 |
| Takenate ® D-110N (g) | 2.65 | 2.65 |
| guanazole (g) | 0.98 | 0.98 |
| 2-phenylethyl 2-oxo-2-phenylacetate (g) | 33 | 40 |

Example 17

Sensory Analysis of the Release of Perfuming Ingredients from Fresh Samples of Microcapsules of the Invention in a Consumer Product (Day Cream)

The tests were carried out using a standard day cream formulated from Phases A-D and having the following final composition:

| | | |
|---|---|---|
| A | Arlacel ® 985 (origin: Atlas Powder Company) | 5.0% by weight |
| | Cetyl alcohol (origin: Sigma-Aldrich) | 0.5% by weight |

| | | |
|---|---|---|
| | Tefose ® 2561 (origin: Gattefossé SA) | 4.0% by weight |
| | Biolip P 90 (Squalan) (origin: Gattefossé SA) | 1.0% by weight |
| | Mineral oil 30-40 CPS (Paraffin oil) | 2.0% by weight |
| | Petroleum jelly (Petrolatum) (origin: Holler & Co. GmbH) | 5.5% by weight |
| B | Water (deionized) | 76.2% by weight |
| | Propylene glycol | 5.0% by weight |
| C | Nipaguard PO 5 (phenoxyethanol (and) piroctone olamine) (origin: Clariant) | 0.6% by weight |
| D | PNC 400 (sodium carbomer) (origin: 3V International) | 0.2% by weight |

Preparation of the Day Cream

Phases A and B were heated separately to 70-75° C., then phase A was added to phase B. Vacuum was applied and the phases were mixed before the mixture was cooled to room temperature. The colloidal mill (Type MZ, incorporated in a Fryma VME-120 mixer and composed of a crosswise-toothed grinding set) was switched on (0.4 opening) during cooling from 65° C. to 55° C. (for ca. 15 min) Phase C (Nipaguard PO 5) was added at 45-50° C. and the mixture was kept mixing for 5 min before Phase D (PNC 400) was added. After 3 min, the colloidal mill was switched on (0.4 opening) and kept running for 15 min. The mixing was resumed at room temperature, at 30° C. the mill was switched on again for another 15 min until the cream became homogeneous, glossy and without lumps. Finally, if necessary, the pH was adjusted to the requested value (e.g. with a solution of citric acid).

Sensory Analysis of the Release of a Perfuming Ingredient (2-Phenylacetaldehyde) from Melamine-Formaldehyde Diffusive Microcapsules I2 Prepared as Described in Example 3

Capsule dispersion I2 described above in Example 3 (0.24 g, corresponding to 0.05% of aldehyde) was added to the above mentioned day cream (99.76 g). Different samples of the day cream (0.15 g) were applied on cardboard blotters (4.5 cm×12 cm). Three blotters were prepared for each sample. The blotters were stored in the dark at room temperature for 3.5 h. One blotter was kept in the dark and the other two were exposed to light at 365 nm for 1 h (using an UVP Upland UVL-28 lamp, 365 nm, 8 W).

The olfactive intensity of the blotters was assessed by 6-8 panelists, using a scale from "0" (no odor) to "10" (very strong odor). The following average intensities for the different samples were determined:

| Tested sample | Average intensity after 4.5 h in the dark | Average intensity after 3.5 h in the dark and exposition to light at 365 nm for 1 h |
|---|---|---|
| Microcapsules I2 of Example 3 | 4.3 | 6.6 |

The evaluation showed significant differences in intensity between the sample kept in the dark and the sample exposed for 1 h to light at 365 nm.

Sensory Analysis of the Release of a Perfuming Ingredient (2-Phenylacetaldehyde) from Polyurea Microcapsules D4 and E4, Prepared as Described in Example 6

The samples were prepared and analyzed as described above for microcapsules I2 using dispersions of microcapsules D4 and E4 (0.22 g and 0.28 g, respectively), corresponding to 0.05% of aldehyde, in the day cream (99.78 g and 99.72 g, respectively). One of the two blotters which were exposed to the light was additionally rubbed.

The following average intensities for the different samples were determined:

| Tested sample | Average intensity after 4.5 h in the dark | Average intensity after 3.5 h in the dark and exposition to light at 365 nm for 1 h | Average intensity after 3.3 h in the dark, exposition to light at 365 nm for 1 h and rubbing |
|---|---|---|---|
| Microcapsules D4 | 1.7 | 4.0 | 4.3 |
| Microcapsules E4 | 2.9 | 1.5 | 4.8 |

The evaluation showed significant differences in intensity between the sample kept in the dark and the sample exposed for 1 h to light at 365 nm and rubbing of the fresh sample. The results show that microcapsules D4, similarly to microcapsules A4, are diffusive for the generated aldehyde, whereas non-diffusive microcapsules E4 retained the corresponding aldehyde but did not prevent its formation (as shown after disrupting the capsules by rubbing).

After rubbing, non-diffusive microcapsules E4 provide (in average) a considerably stronger effect than the diffusive microcapsules D4, thus showing a practical interest to use blends of diffusive and non-diffusive microcapsules according to the invention.

Sensory Analysis of the Release of a Perfuming Ingredient ((Z)-3-Hexenal) from Polyurea Microcapsules E5 Described in Example 7.

The samples were prepared and analyzed as described above for microcapsules I2 using dispersions of microcapsules E5 described in Example 7 (0.30 g, corresponding to 0.05% of aldehyde) in the day cream (99.70 g) and stored in dark at room temperature for 3.3 h. The following average intensities for the different samples were determined:

| Tested sample | Average intensity after 4.3 h in the dark | Average intensity after 3.3 h in the dark and exposition to light at 365 nm for 1 h | Average intensity after 3.3 h in the dark, exposition to light at 365 nm for 1 h and rubbing |
|---|---|---|---|
| Microcapsules E5 of Example 7 | 0.9 | 2.1 | 3.9 |

The evaluation showed significant differences in intensity between the sample kept in the dark and the sample exposed for 1 h to light at 365 nm and rubbing of the fresh sample. In contrast to microcapsules E4, the results show that microcapsules E5 are slightly diffusive for the generated aldehyde.

Sensory Analysis of the Release of a Perfuming Ingredient (Citral) from Polyurea Microcapsules E6 Described in Example 8.

The samples were prepared and analyzed as described above for microcapsules I2 using dispersions of microcapsules E6 described in Example 8 (0.23 g, corresponding to 0.05% of aldehyde) in the day cream (99.77 g).

The following average intensities for the different samples were determined:

| Tested sample | Average intensity after 4.5 h in the dark | Average intensity after 3.5 h in the dark and exposition to light at 365 nm for 1 h | Average intensity after 3.5 h in the dark, exposition to light at 365 nm for 1 h and rubbing |
|---|---|---|---|
| Microcapsules E6 of Example 8 | 2.3 | 1.2 | 6.4 |

The evaluation showed significant differences in intensity between the sample kept in the dark and the sample exposed for 1 h to light at 365 nm and rubbing of the fresh sample. The results show that non-diffusive microcapsules E6 retained the corresponding aldehyde but did not prevent its formation (as shown after disrupting the capsules by rubbing).

Sensory Analysis of the Release of a Perfuming Ingredient (Mugoxal®) from Polyurea Microcapsules E8 Described in Example 10.

The samples were prepared and analyzed as described above for microcapsules I2 using dispersions of microcapsules E8 described in Example 10 (0.59 g, corresponding to 0.05% of aldehyde) in the day cream (99.41 g).

The following average intensities for the different samples were determined:

| Tested sample | Average intensity after 3.75 h in the dark | Average intensity after 2.75 h in the dark and exposition to light at 365 nm for 1 h | Average intensity after 2.75 h in the dark, exposition to light at 365 nm for 1 h and rubbing |
|---|---|---|---|
| Microcapsules E8 of Example 10 | 1.2 | 2.2 | 3.3 |

The evaluation showed significant differences in intensity between the sample kept in the dark and the sample exposed for 1 h to light at 365 nm and rubbing of the fresh sample. The results show that microcapsules E8 are slightly diffusive for the generated aldehyde.

Sensory Analysis of the Release of a Perfuming Ingredient (2-Phenylacetaldehyde) from Formaldehyde-Free Melamine Microcapsules B14 Described in Example 16.

The samples were prepared and analyzed as described above for microcapsules I2 using dispersions of microcapsules B14 described in Example 16 (0.25 g, corresponding to 0.05% of aldehyde) in the day cream (99.75 g).

The following average intensities for the different samples were determined:

| Tested sample | Average intensity after 4.5 h in the dark | Average intensity after 3.5 h in the dark and exposition to light at 365 nm for 1 h | Average intensity after 3.3 h in the dark, exposition to light at 365 nm for 1 h and rubbing |
|---|---|---|---|
| Microcapsules B14 of Example 14 | 1.5 | 2.0 | 4.6 |

The evaluation showed significant differences in intensity between the sample kept in the dark and the sample exposed for 1 h to light at 365 nm and rubbing of the fresh sample.

The results show that microcapsules B14 are slightly diffusive for the generated aldehyde.

Example 18

Sensory Analysis of the Release of Perfuming Ingredients from Aged Samples of Microcapsules of the Invention into a Consumer Product (Day Cream)

Sensory Analysis of the Release of a Perfuming Ingredient (2-Phenylacetaldehyde) from Diffusive Microcapsules I2 Described in Example 3.

The tests were carried out using the standard day cream base described above in Example 17.

Capsule dispersion I2 described above in Example 3 (0.24 g, corresponding to 0.05% of aldehyde) was added to the day cream (99.76 g). The samples were stored at 3° C. in a fridge and at 45° C. in an oven for three months.

Different samples of the day cream (0.15 g) were applied on two cardboard blotters (4.5 cm×12 cm). One blotter was stored in dark (at room temperature) for 1 h, the other was exposed to light at 365 nm for 1 h (using an UVP Upland UVL-28 lamp, 365 nm, 8 W). The olfactive intensity of the blotters was assessed by 5-14 panelists, using a scale from "0" (no odor) to "10" (very strong odor). The following average intensities for the different samples were determined:

| Tested sample | Average intensity after 1 h in the dark | Average intensity exposition to light at 365 nm for 1 h |
|---|---|---|
| Microcapsules I2 of Example 3 3 months at 3° C. | 3.6 | 5.7 |
| Microcapsules I2 of Example 3 3 months at 45° C. | 2.5 | 3.1 |

The evaluation showed significant differences in intensity when comparing of the sample kept in the dark with the sample exposed for 1 h to light at 365 nm and with the sample stored at 3° C.

For the samples kept at 45° C., no significant olfactive difference between the blotters was observed. The microcapsules I2 of Example 3 were not olfactively stable in the day cream application.

Sensory Analysis of the Release of a Perfuming Ingredient (2-Phenylacetaldehyde) from Microcapsules D4 Described in Example 6.

The samples were prepared and analyzed as described above for microcapsules I2 using a dispersion of microcapsules D4 described in Example 6 (0.22 g, corresponding to 0.05% of aldehyde) in the day cream (99.78 g).

The following average intensities for the different samples were determined:

| Tested sample | Average intensity after 4.5 h in the dark | Average intensity after 3.5 h in the dark and exposition to light at 365 nm for 1 h | Average intensity after 3.5 h in the dark, exposition to light at 365 nm for 1 h and rubbing |
|---|---|---|---|
| Microcapsules D4 1 month at 3° C. | 2.9 | 3.9 | 5.9 |
| Microcapsules D4 1 month at 45° C. | 2.8 | 1.4 | 3.4 |
| 2-phenylethyl 2-oxo-2-phenylacetate (WO 99/60990) 1 month at 45° C. | 2.5 | 2.8 | 2.8 |

The evaluation showed significant differences in intensity when comparing the samples kept in the dark, with the samples exposed for 1 h to light at 365 nm and with the samples stored at 3° C.

For the samples kept at 45° C., no significant olfactive difference between the blotters was observed. The microcapsules D4 of Example 6 were not olfactively stable in the day cream application, but nevertheless they were performing after rubbing, thus suggesting that at least a part of the photolabile pro-fragrance was stabilized against hydrolysis under these conditions.

Sensory Analysis of the Release of a Perfuming Ingredient (2-Phenylacetaldehyde) from Microcapsules E4 Described in Example 6.

The samples were prepared and analyzed as described above for microcapsules I2 using a dispersion of microcapsules E4 described in Example 6 (0.28 g, corresponding to 0.05% of aldehyde) in the day cream (99.72 g). The samples were stored at 3° C. in a fridge and at 45° C. in an oven for one month.

The following average intensities for the different samples were determined:

| Tested sample | Average intensity after 4.5 h in the dark | Average intensity after 3.5 h in the dark and exposition to light at 365 nm for 1 h | Average intensity after 3.5 h in the dark, exposition to light at 365 nm for 1 h and rubbing |
|---|---|---|---|
| Microcapsules E4 1 month at 3° C. | 2.4 | 2.9 | 5.4 |
| Microcapsules E4 1 month at 45° C. | 2.8 | 2.4 | 3.6 |

The evaluation showed significant differences in intensity when comparing of the sample kept in the dark with the sample exposed for 1 h to light at 365 nm and with the sample stored at 3° C.

For the samples kept at 45° C., no significant olfactive difference between the blotters was observed. The microcapsules E4 of Example 6 were not olfactively stable in the day cream application, but nevertheless they were performing after rubbing, thus suggesting that at least a part of the photolabile pro-fragrance was stabilized against hydrolysis under these conditions.

Example 19

Dynamic Headspace Analysis of the Fragrance Release from Microcapsules According to the Invention, Incorporated in Consumer Product (all Purpose Surface Cleaner)

Sample Preparation

The use as perfuming ingredient of the present invention's microcapsules has been tested in an all purpose cleaner (APC).

An APC base with the following final composition has been prepared:

| | |
|---|---|
| Neodol ® 91-8 (origin: Shell Chemicals) | 5.0% by weight |
| Marlon ® A 375 (origin: Hüls AG) | 4.0% by weight |
| Sodium cumolsulphonate | 2.0% by weight |
| Kathon ® CG (origin: Rohm and Haas) | 0.2% by weight |
| Water | 88.8% by weight |

For the measurements microcapsules A4 prepared as described in Example 6 and centrifuged to obtain a fraction with an average capsule diameter of ca. 10.1 (±2.0) μm were used. Similarly, microcapsules E10 prepared as described in Example 12 were used in a second experiment.

The APC (1 ml) was added to a freshly prepared dispersion of microcapsules A4 or E10 (each 0.012 mmol with respect to the total amount of fragrance to be released). The sample was then diluted by adding demineralized tap water (9 ml). Reference samples, containing either 2-phenylethyl 2-oxo-2-phenylacetate or decyl 2-oxo-2-phenylacetate as the corresponding non-encapsulated pro-fragrance of formula (I) from the prior art (WO 99/60990, obtained as described in Example 1) or unmodified 2-phenylacetaldehyde or decanal (each 0.012 mmol) were prepared in the same way. The samples were then deposited as a film onto a porous ceramic plate (ca. 5×10 cm) by carefully pipetting sample (0.75 ml) onto the surface of the substrate. The samples were then covered with a crystallizing dish (2 l) and exposed to ambient indoor daylight at room temperature.

Exposure to Light and Dynamic Headspace Analysis Methods

After 24 h, the ceramic plates were each placed inside a headspace sampling cell (ca. 625 ml). The sample with the microcapsules A4, E10, the 2-phenylethyl 2-oxo-2-phenylacetate or the decyl 2-oxo-2-phenylacetate were exposed to a xenon lamp (Heraeus Suntest CPS at about 90000 lux), respectively, while the sample with the free 2-phenylacetaldehyde or the free decanal was exposed to indoor daylight. A constant air flow of ca. 200 ml/min was passed over the samples. The air was filtered through active charcoal and aspirated through a saturated solution of NaCl (to ensure a constant humidity of the air of ca. 75%). In this experimental setup, the headspace sampling cell was not thermostated and an increase of temperature during the measurements was observed. During 15 min the headspace system was left equilibrating, and then the volatiles were adsorbed on a clean Tenax® cartridge for 10 min, then for 20 min on a waste cartridge. Then, four times consecutively, the volatiles were adsorbed for 10 min on a clean cartridge and 20 min on a waste cartridge. The cartridges were desorbed on a Perkin Elmer TurboMatrix ATD desorber coupled to an Agilent 7890A gas chromatograph equipped with a HP 1 capillary column (30 m, i.d. 0.32 mm, film 0.25 μm) and a FID detector. The volatiles were analyzed by gas chromatography (GC) using a two-step temperature gradient starting at 60° C., then going to 130° C. at 15° C./min, then to 220° C. at 40° C./min Headspace concentrations (in ng/l air) were obtained by external standard calibrations using 5-7 different 2-phenylacetaldehyde or decanal concentrations in ethanol. 0.2 μl of the different calibration solutions were each injected three times onto Tenax® cartridges, which were immediately desorbed under the same conditions as those resulting from the headspace sampling. The measurements were carried out in duplicate. The results obtained for the release of 2-phenylacetaldehyde and decanal are summarized in FIG. 2.

As can be seen from FIG. 2a, the invention's microcapsules A4 perform better than the free reference aldehyde or the free reference aldehyde released from prior art 2-phenylethyl 2-oxo-2-phenylacetate. Microcapsules A4 can thus be considered as being diffusive (according to the criteria defined above). After 25 min, almost 150 times more 2-phenylacetaldehyde was measured in the headspace above the sample with microcapsules A4 as compared to the corresponding reference sample with the free aldehyde, and almost 2 times more as compared to the prior art pro-fragrance. After 145 min, still about 25 times more 2-phenylacetaldehyde was evaporated from the sample with the microcapsules than from the reference, and about 1.4 times more than from the prior art pro-fragrance.

FIG. 2b shows that the invention's microcapsules E10 perform better than the free reference aldehyde and slightly less than the aldehyde released from prior art decyl 2-oxo-2-phenylacetate. Microcapsules E10 can thus be considered as being non-diffusive.

What is claimed is:

1. A core-shell microcapsule comprising:
a) a core of an oily phase containing at least one photolabile pro-fragrance ingredient which is a 2-oxoacetate derivative of formula

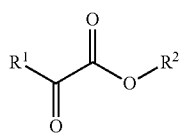

(I)

wherein,
$R^1$ represents a linear, branched or cyclic, saturated or unsaturated $C_1$-$C_{16}$ hydrocarbon group, optionally substituted with one or two methoxy groups, and $R^2$ is a CH(R')(R'') group derived from the corresponding $C_{6-20}$ perfuming aldehyde of formula (R'')CHO or $C_{6-20}$ perfuming ketone of formula (R')(R'')C=O; and
b) a shell surrounding said core and formed by interfacial polymerisation or by a polymerisation induced phase separation process;
wherein the photolabile pro-fragrance ingredient releases a fragrant aldehyde or ketone when exposed to light by transforming the $OR^2$ moiety into a perfuming aldehyde (R'')CHO or ketone (R')(R'')C=O, with simultaneous formation of a $R^1COOH$ or $R^1CHO$ residue.

2. A microcapsule according to claim 1, comprising at least one pro-fragrance ingredient of formula (I) wherein $R^1$ represents a linear, branched or cyclic $C_1$-$C_{10}$ hydrocarbon group.

3. A microcapsule according to claim 1, comprising at least one pro-fragrance ingredient of formula (I) wherein $R^1$ represents a methyl, ethyl, tert-butyl, isopropyl, cyclopentyl or cyclohexyl group or a phenyl group optionally substituted with one or two methoxy groups.

4. A microcapsule according to claim 1, comprising at least one pro-fragrance ingredient of formula (I) wherein $R^2$ is derived from an aldehyde selected from the group consisting of benzaldehyde, 1,3-benzodioxol-5-carboxaldehyde, 3-(1,3-benzodioxol-5-yl)-2-methylpropanal, 3-(4-tert-butyl-1-cyclohexen-1-yl)propanal, 2,4-decadienal, 2-decenal, 4-decenal, 8-decenal, 9-decenal, 3-(6,6-dimethyl-bicyclo[3.1.1]hept-2-en-2-yl)propanal, 2,4-dimethyl-3-cyclohexene-1-carbaldehyde, 3,5-dimethyl-3-cyclohexene-1-carbaldehyde, 1-(3,3-dimethyl-1-cyclohexyl)-1-ethanone, 5,9-dimethyl-4,8-decadienal, 3-(3,3- and 1,1-dimethyl-2,3-dihydro-1H-inden-5-yl)propanal, 2,6-dimethyl-5-heptenal, 3,7-dimethyl-2,6-octadienal, 3,7-dimethyloctanal, 3,7-dimethyl-6-octenal, (3,7-dimethyl-6-octenyl)acetaldehyde, 3-dodecenal, 4-dodecenal, 3-ethoxy-4-hydroxybenzaldehyde, 4-ethyl benzaldehyde, 3-(2 and 4-ethylphenyl)-2,2-dimethylpropanal, 2-furancarbaldehyde, 2,4-heptadienal, 3,5,5,6,7,8,8-heptamethyl-5,6,7,8-tetrahydronaphthalene-2-carbaldehyde, 4-heptenal, 2-hexenal, 3-hexenal, 2-hexyl-3-phenyl-2-propenal, 2-hydroxybenzaldehyde, 7-hydroxy-3,7-dimethyloctanal, 4-hydroxy-3-methoxybenzaldehyde, 4- and 3-(4-hydroxy-4-methylpentyl)-3-cyclohexene-1-carbaldehyde, 4-isopropyl-benzaldehyde, 8-isopropyl-6-methyl-bicyclo[2.2.2]oct-5-ene-2-carbaldehyde, 3-(4-isopropylphenyl)-2-methylpropanal, 2-(4-isopropylphenyl)propanal, 2- and 4-methoxybenzaldehyde, 6-methoxy-2,6-dimethylheptanal, 3-(2-methoxyphenyl)acrylaldehyde, 8(9)-methoxy-tricyclo[5.2.1,0.(2,6)]decane-3(4)-carbaldehyde, 4-methylbenzaldehyde, 3-(4-methylcyclohex-3-en-1-yl)butanal, 2-(4-methylenecyclohexyl)propanal, 1-methyl-4-(4-methyl-3-pentenyl)-3-cyclohexen-1-carbaldehyde, 3-(4-methyl-3-pentenyl)-3-cyclohexene-1-carbaldehyde, 4-(4-methyl-3-pentenyl)-3-cyclohexene-1-carbaldehyde, (4-methylphenoxy)acetaldehyde, (4-methylphenyl)acetaldehyde, 3-methyl-5-phenylpentanal, 2-(1-methylpropyl)-1-cyclohexanone, 2-methyl-4-(2',2',3'-trimethyl-3'-cyclopentenyl)-4-pentenal, 2,4-nonadienal, 2,6-nonadienal, 2-nonenal, 3-nonenal, 6-nonenal, 8-nonenal, 2-octenal, 2-pentyl-3-phenyl-2-propenal, phenoxyacetaldehyde, 2-phenylacetaldehyde, 3-phenylbutanal, 3-phenylpropanal, 2-phenylpropanal, 3-phenyl-2-propenal, 4-(prop-1-en-2-yl)cyclohex-1-enecarbaldehyde, 3-(4-tert-butylphenyl)-2-methylpropanal, 3-(4-tert-butylphenyl)propanal, tricyclo[5.2.1,0(2,6)]decane-4-carbaldehyde, exo-tricyclo[5.2.1,0(2,6)]decane-8exo-carbaldehyde, 2,6,6-trimethyl-bicyclo[3.1.1]heptane-3-carbaldehyde, 2,4,6- and 3,5,6-trimethyl-3-cyclohexene-1-carbaldehyde, 2,2,3-trimethyl-3-cyclopentene-1-acetaldehyde, 2,6,10-trimethyl-2,6,9,11-dodecatetraenal, 2,5,6-trimethyl-4-heptenal, 3,5,5-trimethylhexanal, 2,6,10-trimethyl-9-undecenal, 2-undecenal, 10-undecenal or 9-undecenal and their mixtures, an aldehyde of formula (R'')CHO wherein R'' is a linear or α-branched alkyl group of $C_6$ to $C_{15}$, and their mixtures.

5. A microcapsule according to claim 1, comprising at least one pro-fragrance ingredient of formula (I) wherein $R^2$ is derived from a ketone selected from the group consisting of a damascenone, a damascene, a ionone or methyl ionone, irone, macrocyclic ketone such as, for example, cyclopentadecanone or 3-methyl-4-cyclopentadecen-1-one and 3-methyl-5-cyclopentadecen-1-one or 3-methyl-1-cyclopentadecanone, 1-(2-aminophenyl)-1-ethanone, 1-(3,3-dimethyl-1-cyclohexen-1-yl)-4-penten-1-one, 1-(5,5-dimethyl-1-cyclohexen-1-yl)-4-penten-1-one, 1-(3,3-dimethyl-1-cyclohexyl)-1-ethanone, 2,5-dimethyl-2-octene-6-one, 4,7-dimethyl-6-octene-3-one, (3,7-dimethyl-6-octenyloxy)acetaldehyde, 1-(2,4-dimethylphenyl)-1-ethanone, 4-(1,1-dimethylpropyl)-1-cyclohexanone, 2,4-di-tert-butyl-1-cyclohexanone, ethyl 4-oxopentanoate, 1-(4-ethylphenyl)-1-ethanone, 1-(3,5,5,6,8,8-hexamethyl-5,6,7,8-tetrahydronaphthalen-2-yl)ethanone, 2-hexyl-1-cyclopentanone, 2-hydroxy-3-methyl-2-cyclopenten-1-one, 4-(4-hydroxy-1-phenyl)-2-butanone, 1-(2- and 4-hydroxyphenyl)-1-ethanone, 2-isopropyl-5-methylcyclohexanone, 4-isopropyl-2-cyclohexen-1-one, 1-(5-isopropyl-2-methylcyclohex-1- or 2-en-1-yl)propanone, 1-(4-isopropyl-1-phenyl)-1-ethanone, 2-(2-mercaptopropan-2-yl)-5-methylcyclohexanone, 1-(4-methoxyphenyl)-1-ethanone, 7-methyl-2H,4H-1,5-benzodioxepin-3-one, 5-methyl-3-heptanone, 6-methyl-5-hepten-2-one, methyl 3-oxo-2-pentyl-1-cyclopentaneacetate, 1-(4-methylphenyl)-1-ethanone, 5-methyl-2-(propan-2-ylidene)cyclohexanone, 5-methyl-2-(prop-1-en-2-yl)cyclohexanone, 2-methyl-5-(prop-1-en-2-yl)cyclohex-2-enone, 5-methyl-exo-tricyclo[6.2.1,0(2,7)]undecan-4-one, 3-methyl-4-(1,2,2-trimethylpropyl)-4-penten-2-one, 2-naphthalenyl-1-ethanone, 1-(octahydro-2,3,8,8-tetramethyl-2-naphthalenyl)-1-ethanone, 3,4,5,6,6-pentamethyl-3-hepten-2-one, 2-pentyl-1-cyclopentanone, 4-phenyl-2-butanone, 1-phenyl-1-ethanone, 2- and 4-tert-butyl-1-cyclohexanone, 1-(4-tert-butylphenyl)-1-ethanone), 3,5,6,6-tetramethyl-4-methyleneheptan-2-one, 2,4,4,7-tetramethyl-6-octen-3-one, 1,7,7-trimethyl-bicyclo[2.2.1]heptan-2-one, 2,6,6-trimethyl-1-cycloheptanone, 2,6,6-trimethyl-2-cyclohexene-1,4-dione, 4-(2,6,6-trimethyl-2-cyclohexen-1-yl)-2-butanone, 1-(2,4,4-trimethyl-2- cyclohexen-1-yl)-2-buten-1-one, 1-(3,5,6-trimethyl-3-cyclohexen-1-yl)-1-ethanone, 2,2,5-trimethyl-5-pentyl-1-cyclopentanone or a $C_{6-15}$ ketone of formula (R')(R'')C=o wherein R' and R'' are linear alkyl groups, and their mixtures.

6. A microcapsule according to claim 1, comprising at least one pro-fragrance ingredient of formula (I) selected from the group consisting of 3-(4-tert-butyl-1-cyclohexen-1-yl)propyl 2-oxo-2-phenylacetate, 3-(4-tert-butylphenyl)-2-methylpropyl 2-cyclohexyl-2-oxoacetate, 3-(4-(tert-butyl)phenyl)-2-methylpropyl 2-oxo-2-phenylacetate, decyl 2-cyclohexyl-2-oxoacetate, decyl 2-oxo-2-phenylacetate, (2,4-dimethyl-3-cyclohexen-1-yl)methyl 2-cyclohexyl-2-oxoacetate, (2,4-dimethyl-3-cyclohexen-1-yl)methyl 2-oxo-2-phenylacetate, 1-(3,3- and 5,5-dimethyl-1-cyclohexen-1-yl)-4-pentenyl 2-oxo2-phenylacetate, 3-(3,3- and 1,1-dimethyl-2,3-dihydro-1H-inden-5-yl)propyl 2-oxo-2-phenylacetate, 2,6-dimethyl-5-heptenyl 2-oxo-2-phenylacetate, 3,7-dimethyl-2,6-octadienyl 2-cyclohexyl-2-oxoacetate, 3,7-dimethyl-2,6-octadienyl 2-(4-methylcyclohexyl)-2-oxoacetate, 3,7-dimethyl-2,6-octadienyl 3-methyl-2-oxopentanoate, 3,7-dimethyl-2,6-octadienyl 2-oxo-2-phenylacetate, 3,7-dimethyl-2,6-octadienyl 2-oxopropanoate, 3,7-dimethyl-6-octenyl 2-(4-acetylphenyl)-2-oxoacetate, 3,7-dimethyl-6-octenyl(bicyclo[2.2.1]hept-2exo-yl)oxoacetate, 3,7-dimethyl-6-octenyl 2-cyclohexyl-2-oxoacetate, 3,7-dimethyl-6-octenyl 2-cyclopentyl-2-oxoacetate, 3,7-dimethyl-6-octenyl 2-(4-methylcyclohexyl)-2-oxoacetate, 3,7-dimethyl-6-octenyl[4-(2-methyl-1,3-dioxolan-2-yl)phenyl]oxoacetate, 3,7-dimethyl-6-octenyl 3-methyl-2-oxopentadecanoate, 3,7-dimethyl-6-octenyl 3-methyl-2-oxopentanoate, 3,7-dimethyl-6-octenyl 2-oxobutanoate, 3,7-dimethyl-6-octenyl 2-oxohexadecanoate, 3,7-dimethyl-6-octenyl 2-oxopentanoate, 3,7-dimethyl-6-octenyl 2-oxo-2-phenylacetate, 3,7-dimethyl-6-octenyl 2-oxopropanoate, 4-(1,1-dimethylpropyl)-1-cyclohexyl 2-cyclohexyl-2-oxoacetate, 4-dodecenyl 2-oxo-2-phenylacetate, 3,5,5,6,7,8,8-heptamethyl-5,6,7,8-tetrahydronaphthalen-2-yl)methyl 2-oxo-2-phenylacetate, 1-(3,5,5,6,8,8-hexamethyl-5,6,7,8-tetrahydro-2-naphthalenyl)ethyl 2-oxo-2-phenylacetate, 3-hexenyl 2-oxo-2-phenylacetate, 3-hexenyl 2-oxopropanoate, 7-hydroxy-3,7-dimethyloctyl 2-oxo2-phenylacetate, [4- and 3-(4-hydroxy-4-methylpentyl)-3-cyclohexen-1-yl]methyl 2-oxo-2-phenylacetate, 2-isopropyl-5-methylcyclohexyl 2-cyclohexyl-2-oxoacetate, 2-isopropyl-5-methylcyclohexyl 2-oxo-2-phenylacetate, 4-methoxybenzyl 2-cyclohexyl-2-oxoacetate, [4- and 3-(4-methyl-3-pentenyl)-3-cyclohexen-1-yl]methyl 2-oxo-2-phenylacetate, 3-methyl-5-phenylpentyl 2-oxo-2-phenylacetate, 2-methyl-4-(2',2',3'-trimethyl-3'-cyclopenten-1'-yl)-4-pentenyl 2-oxo-2-phenylacetate, 2,6-nonadienyl 2-oxo-2-phenylacetate, 3-nonenyl 2-oxo-2-phenylacetate, 2-pentyl-1-cyclopentyl 2-cyclohexyl-2-oxoacetate, 4-phenylbutan-2-yl 2-oxo-2-phenylacetate, 2-phenylethyl 2-oxo-2-phenylacetate, 2-phenylethyl 2-oxopropanoate, 3,5,6,6-tetramethyl-4-methyleneheptan-2-yl 2-oxo-2-phenylacetate, 4-(2,6,6-trimethyl-2-cyclohexenyl)-3-buten-2-yl 2-oxo-2-phenylacetate, 9-undecenyl 2-oxo-2-phenylacetate or 10-undecenyl 2-oxo-2-phenylacetate.

7. A microcapsule according to claim 1, wherein said microcapsules has an average size of 1 to 200 micrometers.

8. A microcapsule according to claim 1, wherein said microcapsules has a nominal shell to core mass ratio lower than 20%.

9. A microcapsule slurry consisting of a water-based dispersion or suspension of microcapsules according to claim 1.

10. A perfuming composition characterized in that it comprises:
   a) one or more microcapsules as defined in claim 1, or a slurry according to claim 9;
   b) at least one ingredient selected from the group consisting of a perfumery carrier and a perfumery base; and
   c) optionally at least one perfumery adjuvant.

11. A consumer product, characterized in that it comprises:
   a) as perfuming ingredient, a microcapsule as defined in claim 1, a slurry according to claim 9, or a perfuming composition according to claim 10; and
   b) a consumer product base.

12. A method for intensifying or prolonging the diffusion effect of the characteristic odor of a fragrant aldehyde and/or ketone on a surface, characterized in that said surface is treated with
   a) a microcapsule as defined in any one of claims 1 to 8 or a slurry according to claim 9;
   b) a perfuming composition according to claim 10; or
   c) a consumer product according to claim 11,
   under conditions which are susceptible of allowing the release of the fragrant aldehyde and/or ketone.

* * * * *

UNITED STATES PATENT AND TRADEMARK OFFICE
CERTIFICATE OF CORRECTION

PATENT NO.        : 9,334,464 B2                             Page 1 of 1
APPLICATION NO.   : 14/361389
DATED             : May 10, 2016
INVENTOR(S)       : Berthier et al.

It is certified that error appears in the above-identified patent and that said Letters Patent is hereby corrected as shown below:

In the Claims

Column 46:
Line 30 (claim 5, line 4), after "damascenone, a", change "damascene" to -- damascone --.

Signed and Sealed this
Fifth Day of July, 2016

Michelle K. Lee
*Director of the United States Patent and Trademark Office*